United States Patent
Wang et al.

(10) Patent No.: US 12,163,282 B2
(45) Date of Patent: Dec. 10, 2024

(54) POWDER-ASSEMBLED COMPOSITE MICRO-NANO FIBER AND PREPARATION METHOD THEREOF

(71) Applicant: ZHEJIANG A & F UNIVERSITY, Hangzhou (CN)

(72) Inventors: Hanwei Wang, Hangzhou (CN); Qingfeng Sun, Hangzhou (CN); Chao Wang, Hangzhou (CN); Yingying Li, Hangzhou (CN)

(73) Assignee: ZHEJIANG A & F UNIVERSITY, Hangzhou (CN)

( * ) Notice: Subject to any disclaimer, the term of this patent is extended or adjusted under 35 U.S.C. 154(b) by 5 days.

(21) Appl. No.: 17/890,245

(22) Filed: Aug. 17, 2022

(65) Prior Publication Data

US 2024/0068160 A1 Feb. 29, 2024

(30) Foreign Application Priority Data

Jul. 29, 2022 (CN) .......................... 202210904220.1

(51) Int. Cl.
*D21B 1/30* (2006.01)
*C08B 1/00* (2006.01)
(Continued)

(52) U.S. Cl.
CPC ................ *D21B 1/30* (2013.01); *C08B 1/003* (2013.01); *D21H 11/18* (2013.01); *B82Y 30/00* (2013.01); *B82Y 40/00* (2013.01)

(58) Field of Classification Search
CPC ....... D21H 11/18; C08L 1/02; C08L 2205/16; C08B 1/003; D21B 1/30; B82Y 30/00; B82Y 40/00; D01F 1/10; D01F 2/00
See application file for complete search history.

(56) References Cited

U.S. PATENT DOCUMENTS 9,243,128 B2 * 1/2016 Kumamoto ................ C08L 1/04
10,669,390 B2 * 6/2020 Lapidot ..................... C08J 9/405
(Continued)

FOREIGN PATENT DOCUMENTS

| CN | 106436419 A | 2/2017 |
| CN | 109929126 A | 6/2019 |

(Continued)

OTHER PUBLICATIONS

Sheldon et al., Vapor-phase Fabrication and Properties of Continuous-Filament Ceramic Composites, Science, Sep. 6, 1991, 1104-1109, vol. 253.
(Continued)

*Primary Examiner* — Jose A Fortuna
(74) *Attorney, Agent, or Firm* — Bayramoglu Law Offices LLC

(57) ABSTRACT

The present invention provides a powder-assembled composite micro-nano fiber and a method for preparing the powder-assembled composite micro-nano fiber. The method includes the following steps: (1) preparing two-dimensional cellulose from a cellulose-raw-material; (2) dispersing the two-dimensional cellulose and a powder material in a solvent to form a mixed suspension; and (3) performing freeze drying on the mixed suspension to obtain the powder-assembled composite micro-nano fiber, wherein a temperature difference between two ends in a vertical direction of the mixed suspension is controlled to be 10-100° C. in a freezing process of the freeze drying. In the present invention, a new non-destructive processing path from primary particles to macro applications is constructed, and rich material platforms and infinite possibilities are provided for basic studies and technical applications. The technology will play a huge role in energy, medical material, environment, (Continued)

protection, catalysis, photoelectricity, food engineering, daily necessity and other vast fields.

20 Claims, 30 Drawing Sheets

(51) Int. Cl.
  *D21H 11/18* (2006.01)
  *B82Y 30/00* (2011.01)
  *B82Y 40/00* (2011.01)

(56) References Cited

U.S. PATENT DOCUMENTS

| | | | |
|---|---|---|---|
| 12,060,274 B2* | 8/2024 | Hu | C01B 32/21 |
| 2003/0073158 A1* | 4/2003 | Ma | B01J 20/262 |
| | | | 435/68.1 |
| 2020/0224001 A1* | 7/2020 | Toivonen | C09D 5/03 |
| 2024/0068160 A1* | 2/2024 | Wang | C08B 1/003 |

FOREIGN PATENT DOCUMENTS

| | | | | |
|---|---|---|---|---|
| CN | 114552124 A | | 5/2022 | |
| CN | 115262011 A | * | 11/2022 | C08B 1/003 |
| EP | 2511346 B1 | * | 9/2016 | C08B 15/04 |
| EP | 3121232 A1 | * | 1/2017 | C08B 15/04 |
| WO | WO-2010131602 A1 | * | 11/2010 | C08J 5/06 |
| WO | WO-2012134378 A1 | * | 10/2012 | B82Y 30/00 |
| WO | 2020212616 A1 | | 10/2020 | |
| WO | WO-2022239761 A1 | * | 11/2022 | |

OTHER PUBLICATIONS

Bao et al., One-pot Synthesis of Pt—Co Alloy Nanowire Assemblies with Tunable Composition and Enhanced Electrocatalytic Properties, Angew. Chem. Int. Ed., 2015, 3797-3801, vol. 54.

Wu et al., Stable Cycling of Double-walled Silicon Nanotube Battery Anodes through Solid-electrolyte Interphase Control, Nature Nanotechnology, May 2012, 310-315, vol. 7.

Nie et al., Properties and Emerging Applications of Self-assembled Structures Made from Inorganic Nanoparticles, Nature Nanotechnology, Jan. 2010, 15-25, vol. 5.

Chang et al., Reversible Fusion and Fission of Graphene Oxide-based Fibers, Science, May 7, 2021, 614-617, vol. 372.

Baumgarten, Electrostatic Spinning of Acrylic Microfibers, Journal of Colloid and Interface Science, May 1971, 71-79, vol. 36.

Kaufman et al., Structured Spheres Generated by an In-fibre Fluid Instability, Nature, Jul. 18, 2012, 463-467, vol. 487(7408).

Murphy et al., Microcrystalline Cellulose Reinforced Polylactic Acid Biocomposite Filaments for 3D Printing, Polymer Composites, 2018, 1311-1320, vol. 39(4).

Liu et al., One-Step Synthesis of Single-Layer $MnO_2$ Nanosheets with Multi-Role Sodium Dodecyl Sulfate for High- Performance Pseudocapacitors, small, 2015, vol. 11(18).

Avci et al., Self-assembly of Polyhedral Metal-organic Framework Particles into Three-dimensional Ordered Superstructures, Nature Chemistry, 2018, 78-84, vol. 10.

* cited by examiner

POWDER-ASSEMBLED COMPOSITE MICRO-NANO FIBER AND PREPARATION METHOD THEREOF

RELATED APPLICATION

The present application claims the benefit of the Chinese Patent Application No. CN202210904220.1 filed Jul. 29, 2022, which is incorporated herein by reference in its entirety.

FIELD OF THE INVENTION

The present invention belongs to the technical field of preparation of micro-nano fibers. Particularly, it relates to a method for converting a powder material into a composite micro-nano fiber and a micro-nano fiber prepared by the method.

BACKGROUND OF THE INVENTION

What is written under the background art is meant to provide background information useful for understanding the technical solutions of the present application, but does not necessarily constitute the prior art for evaluating whether the present invention has creativeness. First-hand materials produced under current industrial conditions are absolutely dominant in a powder form. However, in the process of using powder materials, due to problems such as agglomeration and lack of structural mechanical properties, the powder materials have to be made into blocks or films or attached to mechanical structural bodies for use. Meanwhile, it is often difficult for various powder materials to maintain their precise structures, diversification characteristics and nano-scale advantages in a forming process, resulting in deterioration of the performance of profiles. If powder can be prefabricated into a fiber, the performance of a primary material is maintained on the micro scale, and a forming space is reserved on the macro scale in a forming direction of a block and a film. Since the powder has a long-range continuous mechanical structure in a lengthwise direction, the advantages and good dispersion in the nano scale are maintained both inside and in a width direction.

Common methods such as a vapor-phase or liquid-phase growth method, a template method, and a self-assembly method have been developed to synthesize one-dimensional micro-nano materials with various structures, morphologies, and sizes. However, in most cases, prepared fiber materials usually exist in the form of powder due to their insufficient length-to-diameter ratios, and there are few complex intra-fiber secondary structures synergistic with different component functional units; and higher requirements are put forward to synthesis equipment, reaction conditions and waste treatment capacity.

In a chemical vapor infiltration/deposition method, under specific conditions, such as a high temperature or a special atmosphere, precursor vapor gradually reacts and deposits on a surface of a seed crystal to grow and form a fibrous material, and the formed fibrous structure is uniform and does not have a secondary micro-nano structure, referring to FIG. 1. In the liquid-phase growth method, a single crystal grows from a liquid-solid balance system, and most grown fibers are single crystals, which are mostly applicable to elemental or oxide crystals, referring to FIG. 2. In the template method for synthesizing fibers, relevant materials are deposited in pores or on a surface of a template physically or chemically, and the template is then removed, or a fiber material with a morphology and size according to a template specification is obtained using the characteristics of the template, referring to FIG. 3. The self-assembly is a method for physically or chemically assembling specific or pretreated precursor elements into fibers. The used precursor elements usually need to make certain responses to external conditions such as magnetism, electricity, light and heat, referring to FIG. 4. Through a precise design and regulation of an experiment and matching of equipment use conditions, these technologies can well prepare specific types of fibers.

However, these synthesis technologies generally obtain fiber products by means of complex and expensive chemicals and equipment at the expense of structures and properties of precursors. The fibers synthesized by these methods usually have a single structure and type. To obtain a particular secondary micro-nano structure, a large number of additional modifications and processing technologies are required to fabricate corresponding structural and functional fibers, so these methods cannot be used as a general forming technology for powder materials.

In addition, spinning, extrusion blending, and three-dimensional printing are the most widely used technologies to fabricate polymer matrix fibers. In these technologies, micro-nano guest materials can be easily attached to the interiors of the fibers to obtain nano-organic, inorganic or organic/inorganic hybrid micro-nano fibrous structural materials with various components, sizes and morphologies. Spinning includes wet spinning and electrospinning, both of which are to prepare micro-nano fibers by taking a polymer matrix as a framework. Most of fibers obtained by the wet spinning are tens to hundreds of microns in thickness, and nano-scale or submicron-scale fibers cannot be obtained, referring to FIG. 5. Fibers obtained by electrospinning are in nano sizes to micron sizes, and obtained final fiber materials are mostly adhered to each other, referring to FIG. 6. The extrusion blending refers to a process in which two or more polymers are mixed to prepare macroscopically uniform materials. All components are mainly physically combined. This is also a gradual method for preparing fibers. Thicknesses of the obtained fibers are mostly in microns or above, referring to FIG. 7. Three-dimensional printing is a technology that builds objects using an adhesive material such as powdered metal or plastic by means of layer-by-layer printing based on a digital model file. The thicknesses of fibers obtained by this technology are mostly tens of microns or above, referring to FIG. 8.

However, fibers in nano size can be obtained only by the electrospinning, and most of other polymer fibers have thicknesses of dozens of microns to millimeters. With this thickness, nano-sized guest materials are usually tightly encapsulated by polymers, and cannot fully exert the advantages under the nano size. In addition, in order to maintain a basic mechanical structure of a fiber, a large number of polymers have to be used as structural support bodies. As a result, the content of guests in a polymer fiber is still low (<40%), and its macroscopic behavior is still dominated by a polymer. In addition, although various guest materials can be added to a precursor solution, particular solution conditions of different fibers and the extremely high reactivity of a precursor solution lead to a limited number of guest particles that can be added, and the size of each guest material needs to be smaller than that of a spray or extrusion opening of equipment, or it will cause irreversible damage to instruments. Therefore, the complex physical and chemical environments and working conditions of the equipment and the polymer solution have strict requirements on the structure, chemical properties and content of the guest material. Therefore, only some guest materials of particular types and morphologies have been integrated into a micro-nano fiber so far.

In view of the above-mentioned situation in the prior art, it is urgent to develop a method for transforming all types of guest materials with wider particle size distributions and different micro-nano structures, particular powder materials in industrial-grade micro-nano sizes and with fine structures, into micro-nano fibers.

OBJECTS AND SUMMARY OF THE INVENTION

Therefore, the present invention aims to overcome the shortcomings in the prior art and provide a method for inducing lossless transformation of a powder material into a micro-nano fiber by means of adding an intermediate between a powder raw material and a target fiber to control a transition process under an appropriate design and construction.

A first aspect of the present invention provides a method for preparing a powder-assembled composite micro-nano fiber. The method includes steps of:
 (1) preparing two-dimensional cellulose from a cellulose-raw-material;
 (2) dispersing the two-dimensional cellulose and a powder material in a solvent to form a mixed suspension; and
 (3) performing freeze drying on the mixed suspension to obtain a powder-assembled composite micro-nano fiber, wherein a temperature difference between two ends in a vertical direction of the mixed suspension is controlled to be 10-100° C. in a freezing process of the freeze drying.

The two-dimensional cellulose has a flake structure with a thickness of 0.1-20 nanometers; a size of the two-dimensional cellulose in a plane direction is greater than 1 micrometer; and a ratio of the maximum size in the plane direction to a thickness is greater than 200.

With a large number of experimental studies, the inventor of the present invention has unexpectedly found out that, with the assistance of the two-dimensional cellulose, by means of controlling the temperature difference between upper and lower ends in the freezing process to adjust the solidification rate of the solvent in the mixed suspension, precise micro-nano structures and physical and chemical properties of powder particles in the resulting powder-assembled composite micro-nano fiber are not damaged, and the content and components of powder assembled into the fiber are controllable, thus completing the present invention.

According to the preparation method provided by the present invention, the two-dimensional cellulose has a two-dimensional planar structure with a nano-scale thickness (for example, 0.5-20 nanometers), which is self-assembled by plant cellulose fibers and/or bacterial cellulose fibers through hydrogen bonds. The size of the two-dimensional cellulose in the plane direction can vary in an extremely wide range, for example, 1 micrometer to 10 centimeters.

The inventor has obtained a kind of two-dimensional cellulose with a particular new structure through lots of experimental studies, and the two-dimensional cellulose is particularly beneficial to the preparation of the composite micro-nano fiber of the present invention. The thickness of the two-dimensional cellulose may preferably be 3-5 nanometers (as shown in FIG. 9). This thickness is significantly less than that of those two-dimensional celluloses commonly found in the prior art. The two-dimensional cellulose has a continuous flake structure (as shown in FIG. 10), and its size in the plane direction can range from several micrometers to hundreds of micrometers, for example, 1 to 800 micrometers. Preferably, a ratio of the maximum size to the thickness of the two-dimensional cellulose in the plane direction is greater than 200. As shown in FIG. 11, the crystallinity of the two-dimensional cellulose prepared in the present invention is less than that of lignocellulose paper, and the chemical structure of the two-dimensional cellulose has no difference from that of traditional cellulose (as shown in FIG. 12).

In a preferred implementation solution of the present invention, preparing the two-dimensional cellulose from the cellulose-raw-material in step (1) may include the following steps:
 (1-1) partially dissociating the cellulose in a first solvent with a high-frequency ultrasound to form a suspension of cellulose nano fibers with continuous branched structures;
 (1-2) replacing the first solvent in the suspension with a second solvent, and then performing freeze drying on the obtained cellulose nano fiber suspension to obtain a crude two-dimensional cellulose, wherein the temperature difference between the two ends of the suspension in the vertical direction is controlled to be 10-100° C.

In some preferred implementation solutions, steps (1-1) and (1-2) may be repeated for several times to improve the purity of the two-dimensional cellulose, for example, twice to five times. Preferably, the purity of the two-dimensional cellulose is improved to 95% or above by repeating steps (1-1) and (1-2).

The principle of the method for forming the cellulose nano fiber suspension with a large number of branched structures in step (1-1) is as follows: with the assistance of the first solvent and the physical high-frequency ultrasound, a fibril crystalline region of the cellulose is partially opened to form cellulose nano fibers with continuous branched structures in the first solvent. Different cellulose nano fibers are interconnected through the continuous branched structures, which lays a structural foundation for the subsequent step of assembling the two-dimensional cellulose.

The key to form the two-dimensional cellulose in step (1-2) lies in the solvent replacement, the freeze drying process, and the control of the temperature difference in the freezing process.

The solvent and its low-temperature crystals have unique physicochemical properties, and replacing the solvent helps to control the solidification rate of the solvent, which has a positive effect on the production of the two-dimensional cellulose.

The first solvent can be selected from one or more of water, ethanol, and ethylene glycol, and the second solvent can be selected from one or more of tert-butanol, benzene, and methylbenzene.

In the freezing process, the degree of self-assembly of hydrogen bonds of the cellulose nanofibers with the continuous branched structures is regulated by controlling the crystallization rate of the second solvent. In the freezing process, the growth of second solvent crystals repels the cellulose nano fibers with the continuous branched structures, so that the cellulose nano fibers are assembled into the two-dimensional cellulose under the action of the hydrogen bonds after being compressed at an intersection of solid solvent crystals. In addition, the assembled two-dimensional cellulose is in a semi-stable state due to a vacuum drying process. According to the preparation method provided by the present invention, the method for forming the mixed suspension in step (2) may be dispersing the two-dimensional cellulose and the powder material in the solvent simultaneously or sequentially. For example, in one preferred implementation solution, step (2) includes: dispersing the two-dimensional cellulose in the solvent to form two-dimensional cellulose suspension, and then dispersing the powder material in the two-dimensional cellulose suspension to form the mixed suspension.

According to the preparation method provided by the present invention, the concentration of the two-dimensional cellulose in the mixed suspension can be 0.01-10 g/L, preferably 1-5 g/L.

Due to a huge difference between different powder materials, the amount of the powder material in the mixed suspension of step (2) may be expressed by a volume fraction f:

$$f = \frac{V1}{M2},$$

where V1 is a bulk volume of the powder material, $$V1 = \frac{M1}{d1}; M1$$

is a mass of the powder material; d1 is a tap density of the powder material; and M2 is a mass of the two-dimensional cellulose.

According to the preparation method provided by the present invention, the volume fraction f of the powder material in the mixed suspension formed in step (2) may be 0.001-10, preferably 0.1-9.

In the finally prepared composite micro-nano fiber, the content of the powder material may vary within an extremely wide range, for example, 0.01-95 wt %.

According to the preparation method provided by the present invention, in step (2), the mixed suspension containing the two-dimensional cellulose and the powder material is preferably ultrasonically dispersed for 1 second to 1 hour, and the temperature is controlled to be −10 to 30° C.

According to the preparation method provided by the present invention, preferably, the freezing process in step (3) is carried out with the assistance of an ultra-low temperature fluid fumigation device, so as to control the temperature difference. The ultra-low temperature fluid maybe one or more of liquid helium, liquid nitrogen, and liquid oxygen.

Preferably, the drying process of the freeze drying in step (3) is carried out in a freeze dryer, a temperature of freeze drying may be determined according to the selected solvent, and the duration of freeze drying may be 2-80 hours.

According to the preparation method provided by the present invention, the cellulose-raw-material in step (1) may be a plant cellulose fiber and/or a bacterial cellulose fiber. The plant cellulose may include one or more of moso bamboo, neosinocalamusaffinis, spruce, fir, Korean pine, poplar, sorghum stalk, corn stalk, mulberry bark, bark of Wikstroemiapilosa Cheng, rice straw, wheat straw, reed, cotton, cotton linter, kenaf, jute, flax, banana leaf, agave hemp, Chinese alpine rush, *Cyperus malaccensis*, and bagasse. Microorganisms for preparing the bacterial cellulose may be selected from one or more of *Acetobacter, Rhizobium, Gluconobacter, Acetobacter xyloides, Sarcina, Pseudomonas, Achromobacter, Alcaligenes, Aerobacter, Azotobacter* and *Agrobacterium*; and a carbon source of a fermentation culture medium for preparing the bacterial cellulose may be one or more of glucose, sucrose, lactose, maltose, mannitol and arabinose.

According to the preparation method provided by the present invention, content of amorphous cellulose in the two-dimensional cellulose may be 30-50 wt %.

According to the preparation method provided by the present invention, the powder material may be any powdery micro-nano material. Preferably, a particle size of the powder material may be 1 nanometer-10 micrometers. In some implementation solutions of the present invention, the powder material may be one or more of tungsten powder, niobium powder, nickel powder, titanium powder, molybdenum powder, tantalum powder, carbon powder, silicon powder, diamond, silver powder, iron powder, chromium oxide, tungsten oxide, hydroxyapatite, holmium oxide, barium titanate, indium oxide, nickel oxide, zinc oxide, aluminum oxide, silicon dioxide, cerium oxide, magnesium oxide, strontium titanate, samarium oxide, gadolinium oxide, iron oxide, lithium iron phosphate, manganese dioxide, tin antimony oxide, zirconium oxide, zinc ferrite, copper oxide, zirconium carbide, silicon carbide, titanium carbide, tungsten carbide, silicon nitride, titanium nitride, molybdenum sulfide, tungsten sulfide, germanium phosphide, zinc-MOF, polypyrrole, iron-MOF and polystyrene. In addition, the powder material may also be a linear nanomaterial such as a carbon nanotube and a hydroxyapatite nanowire.

According to the preparation method provided by the present invention, the solvent may be any common solvent, as long as it is inert with respect to the selected two-dimensional cellulose and powder material. For example, the solvent may be one or more of water, ethanol, ethylene glycol, tert-butanol, benzene, and methylbenzene.

A second aspect of the present invention also provides a powder-assembled composite micro-nano fiber prepared by the above method. A diameter of the powder-assembled composite micro-nano fiber may be 0.01-20 micrometers, and a length of the powder-assembled composite micro-nano fiber may be 100 micrometers-50 millimeters. The type of the powder material in the powder-assembled composite micro-nano fiber is unlimited and may be customized, and the content of the powder material is adjustable within a wide range, for example, 0.01 wt %-95 wt %.

Microscopic analysis shows that the powder material in the powder-assembled composite micro-nano fiber is wrapped in the two-dimensional cellulose in a layer-by-layer winding manner while the powder material shows no structural and morphological damage. The powder-assembled composite micro-nano fiber may be further processed into one or more of linear, bulk, aerogel, and film-like materials.

The method for transforming the powder material into the composite micro-nano fiber provided by the present invention does not limit the type of the powder material, and is a universal method. Compared with the prior art, the present invention has the following advantages:

(1) The preparation method of the present invention has no requirements on the morphology, the density and other properties of micro-nano powder, and the micro-nano powder can be flaky, linear, flower-like, bulk, spherical and the like, and can be used to prepare the composite micro-nano fiber as long as its size is less than the tolerance limit of a diameter of a fiber.

(2) In the composite micro-nano fiber prepared by the present invention, the precise micro-nano structure and physical and chemical properties of the powder particles are not damaged, and the content and components of the powder in the fiber are controllable.

(3) The composite micro-nano fiber prepared by the present invention has an adjustable diameter (tens of nanometers to tens of micrometers) in a width direction, has an adjustable diameter of tens of millimeters in a lengthwise direction, and the length-to-diameter ratio is up to $10^6$ which fully meets a current use demand for the micro-nano fiber.

(4) The composite micro-nano fiber of the present invention can be further customized and processed into linear, bulk and film-like engineering artificial materials and engineering artificial materials in other shapes according to actual needs, which can show extremely excellent performance in various fields.

In the present invention, a new non-destructive processing path from primary particles to macro applications is constructed, and rich material platforms and infinite possibilities are provided for basic studies and technical applications. This technology will play a huge role in energy, medical material, environment, protection, catalysis, photoelectricity, food engineering, daily necessity and other vast fields.

DETAILED DESCRIPTION OF THE EMBODIMENTS

The present invention will be further described below in conjunction with the embodiments. The embodiments are only explanatory, and are not meant to limit the scope of the present invention in any way.

In the following embodiments, for the sake of brevity, the abbreviation "GAF" stands for "micro-nano fiber."

Embodiment 1

(1) 10 grams of moso bamboo cellulose was put into 100 ml of a mixed solution of water and ethanol (3:1); 100 ml of hydrochloric acid aqueous solution (2 mol/L) was added; the mixture was heated at 80° C. for 5 hours.

(2) After filtration, a mixed solution of cellulose molecules/hydrochloric acid was obtained. The hydrochloric acid, water and ethanol in the suspension were then replaced with tert-butanol to obtain a high-purity cellulose molecule tert-butanol solution.

(3) 0.05 ml of supernatant obtained in step (2) was dropped to a surface of an ice cube at −50° C.; after the supernatant was frozen, the frozen supernatant on the surface of the ice cube was scrapped off with a scraper.

(4) The frozen supernatant was placed in vacuum for drying at a low pressure to obtain two-dimensional cellulose.

Figure 1:
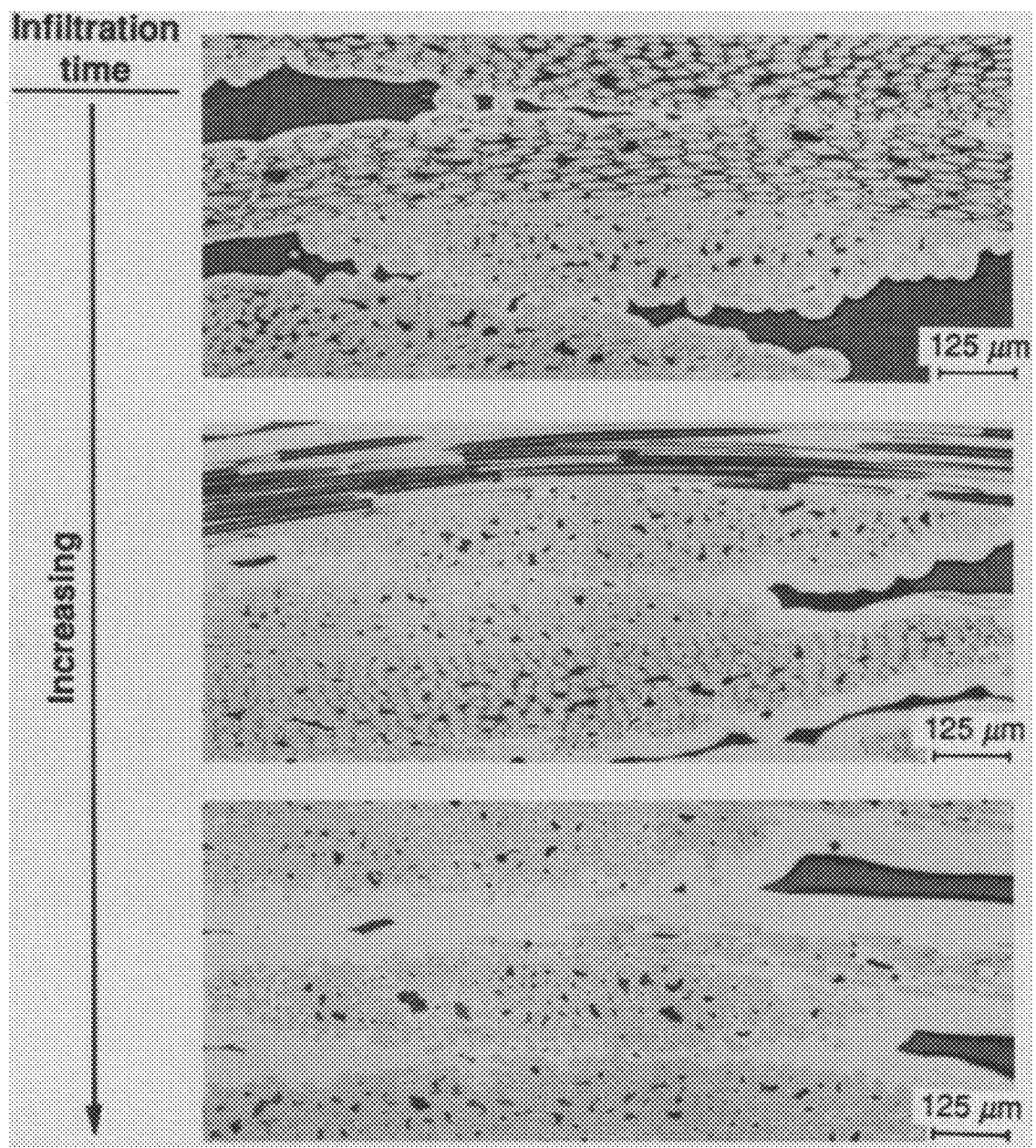
FIG. 1 is taken from FIG. 4 in SHELDON et al., Vapor-phase Fabrication and Properties of Continuous-Filament Ceramic Composites, Science, Sep. 6, 1991, 1104-1109, Vol. 253.
Figure 2:
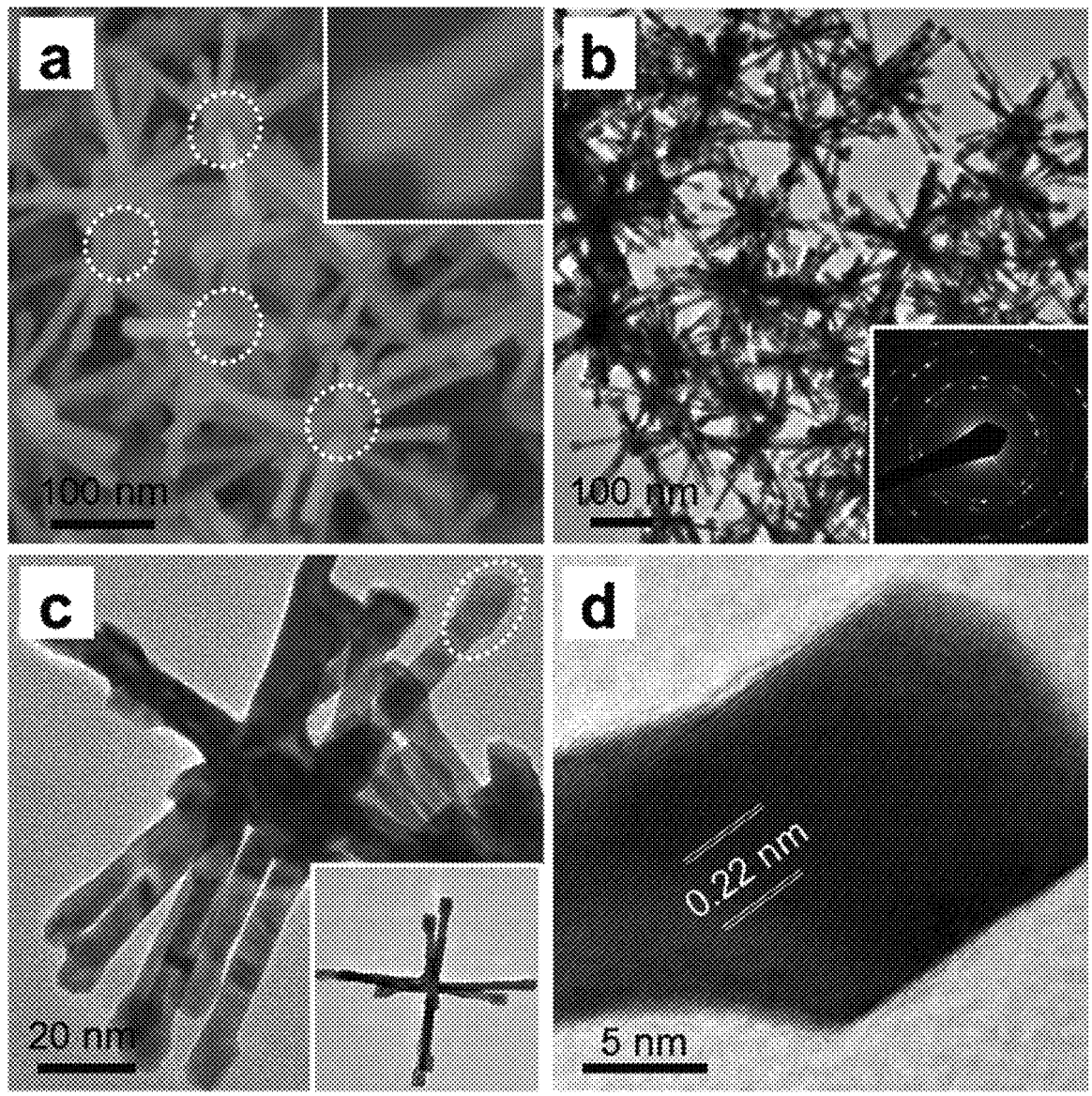
FIG. 2 is taken from FIG. 1 in BAO et al., One-pot Synthesis of Pt-Co Alloy Nanowire Assemblies with Tunable Composition and Enhanced Electrocatalytic Properties, Angew. Chem. Int. Ed., 2015, 3797-3801, Vol. 54.
Figure 3:
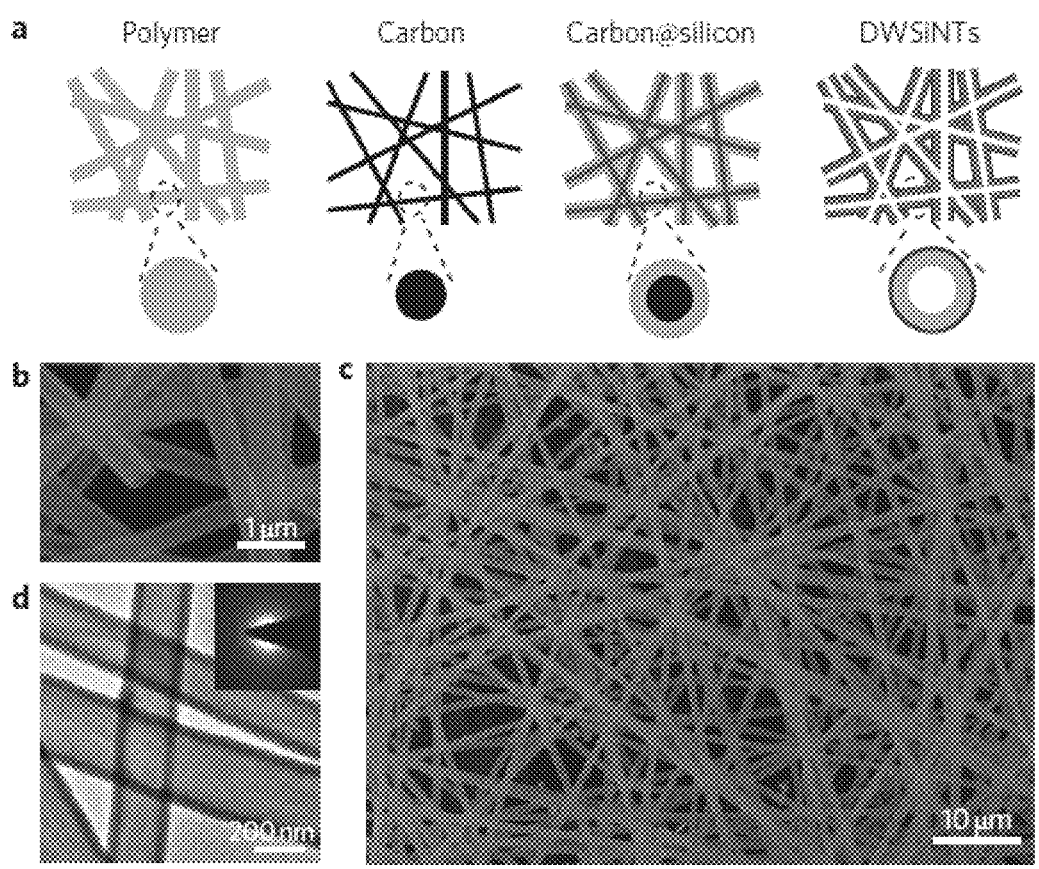
FIG. 3 is taken from FIG. 2 in WU et al., Stable Cycling of Double-walled Silicon Nanotube Battery Anodes through Solid-electrolyte Interphase Control, Nature Nanotechnology, May 2012, 310-315, Vol. 7.
Figure 4:
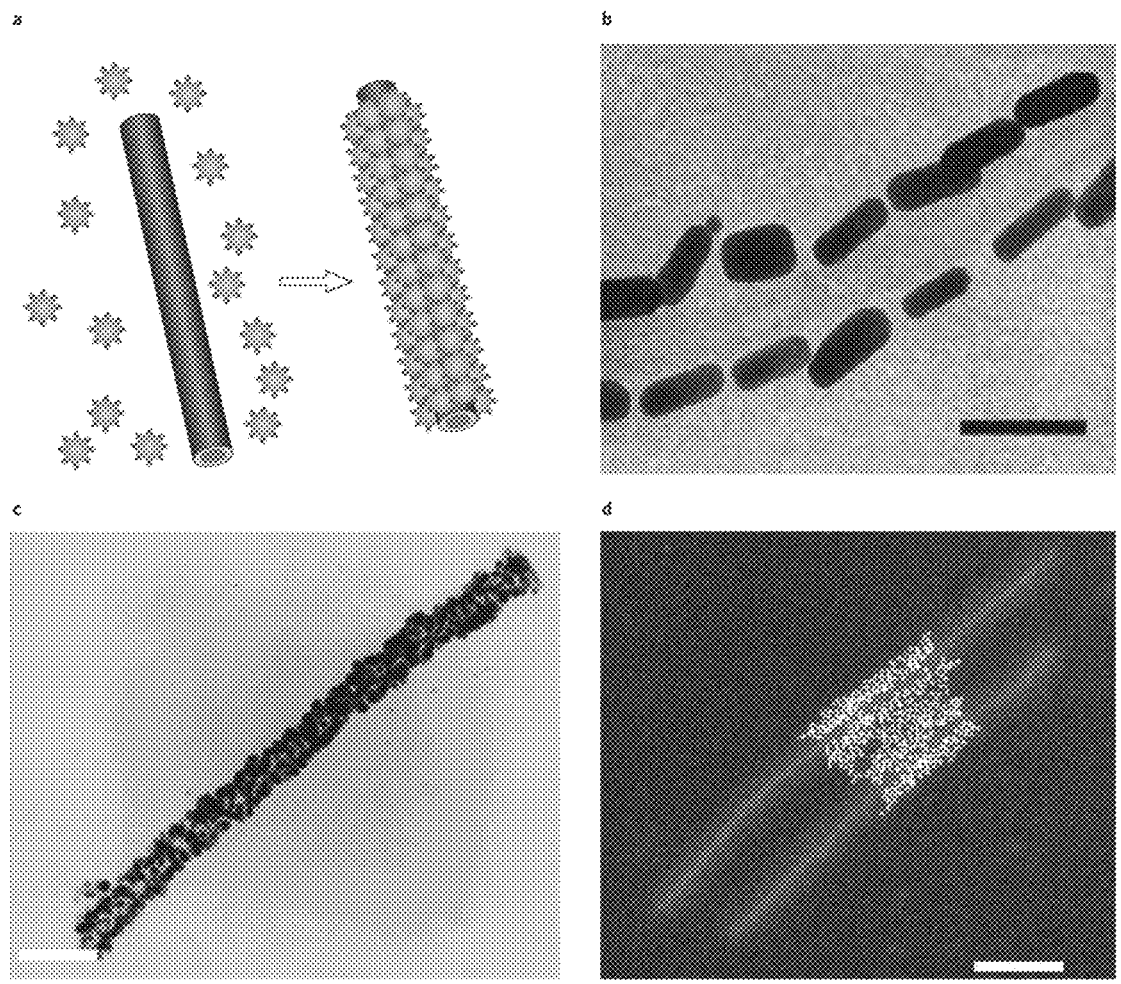
FIG. 4 is taken from FIG. 2 in NIE et al., Properties and Emerging Applications of Self-assembled Structures Made from Inorganic Nanoparticles, Nature Nanotechnology, January 2010, 15-25, Vol. 5.
Figure 5:
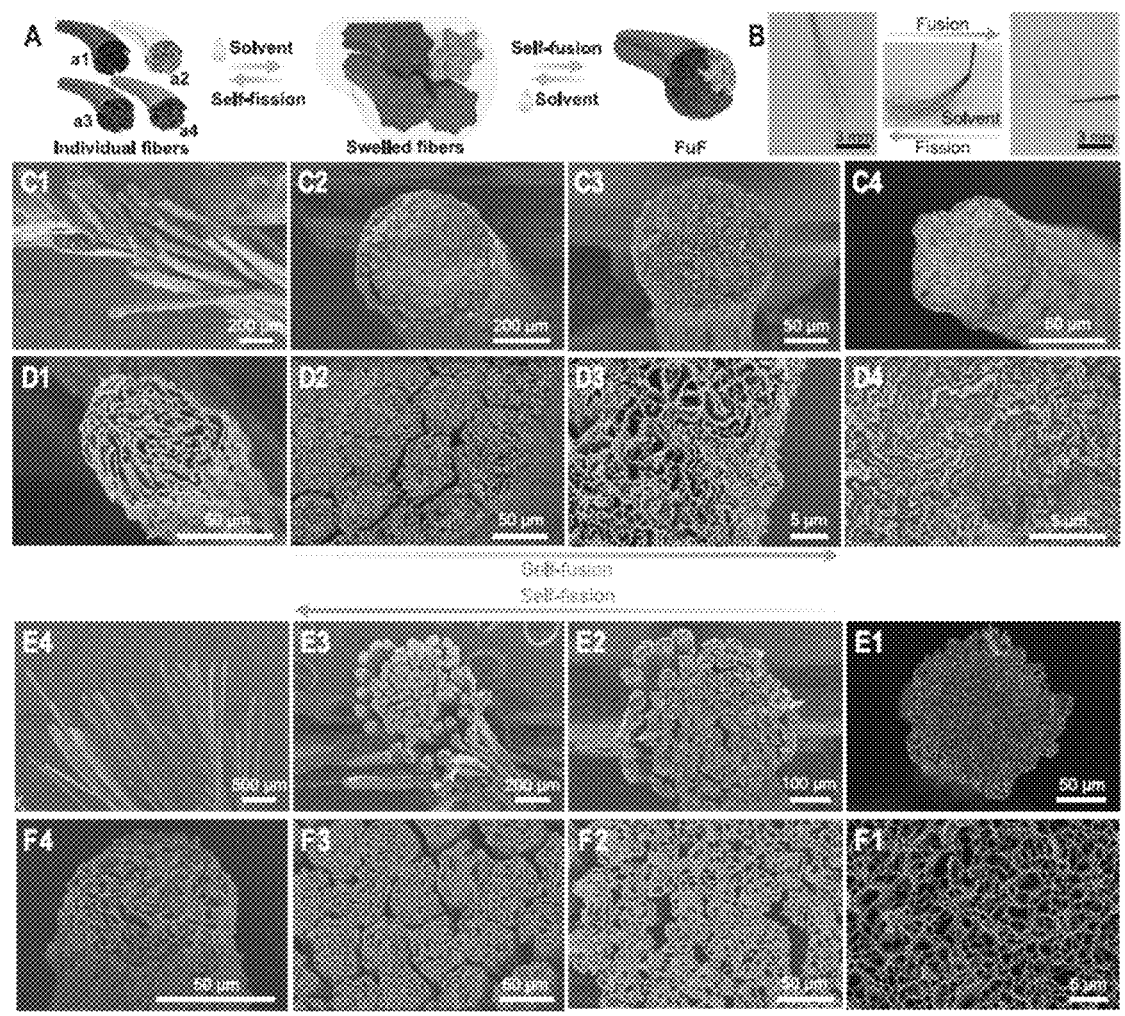
FIG. 5 is taken from FIG. 1 in CHANG et al., Reversible Fusion and Fission of Graphene Oxide-based Fibers, Science, May 7, 2021, 614-617, Vol. 372.
Figure 6:
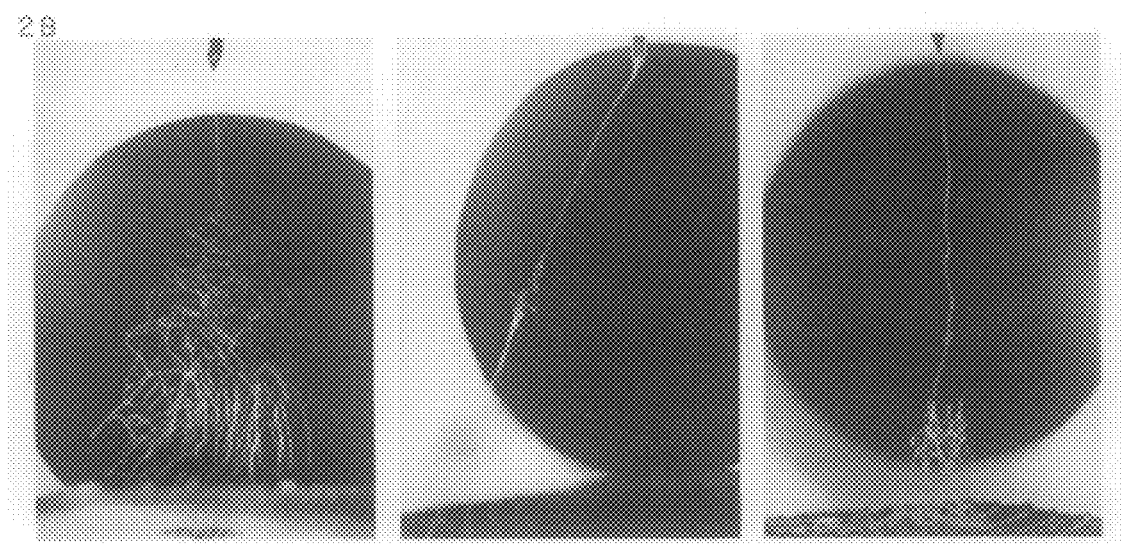
FIG. 6 is taken from FIG. 2B in BAUMGARTEN, Electrostatic Spinning of Acrylic Microfibers, Journal of Colloid and Interface Science, May 1971, 71-79, Vol. 36.
Figure 7:
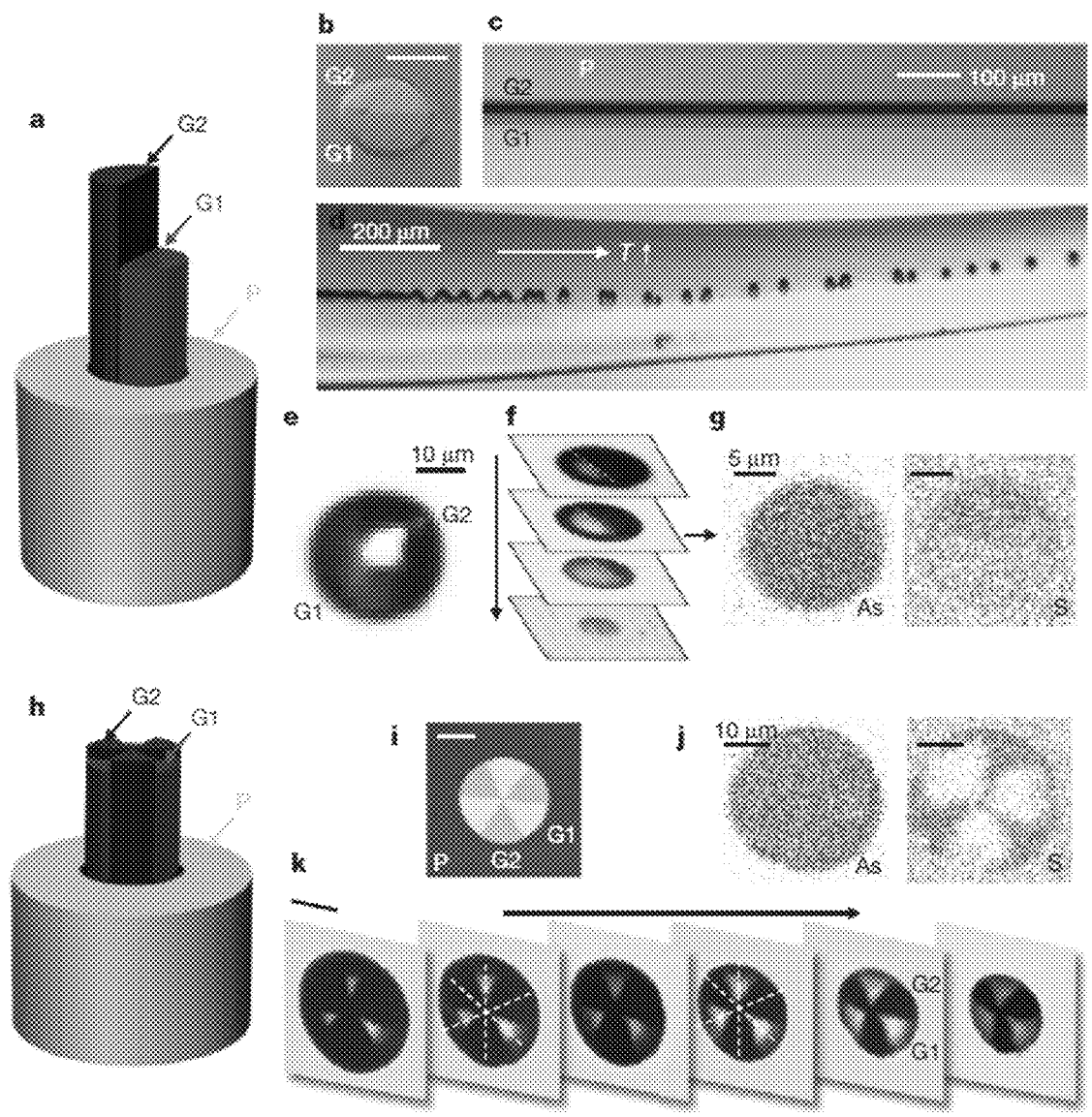
FIG. 7 is taken from FIG. 4 in KAUFMAN et al., Structured Spheres Generated by an In-fibre Fluid Instability, NATURE, Jul. 18, 2012, 463-467, Vol. 487(7408)
Figure 8:
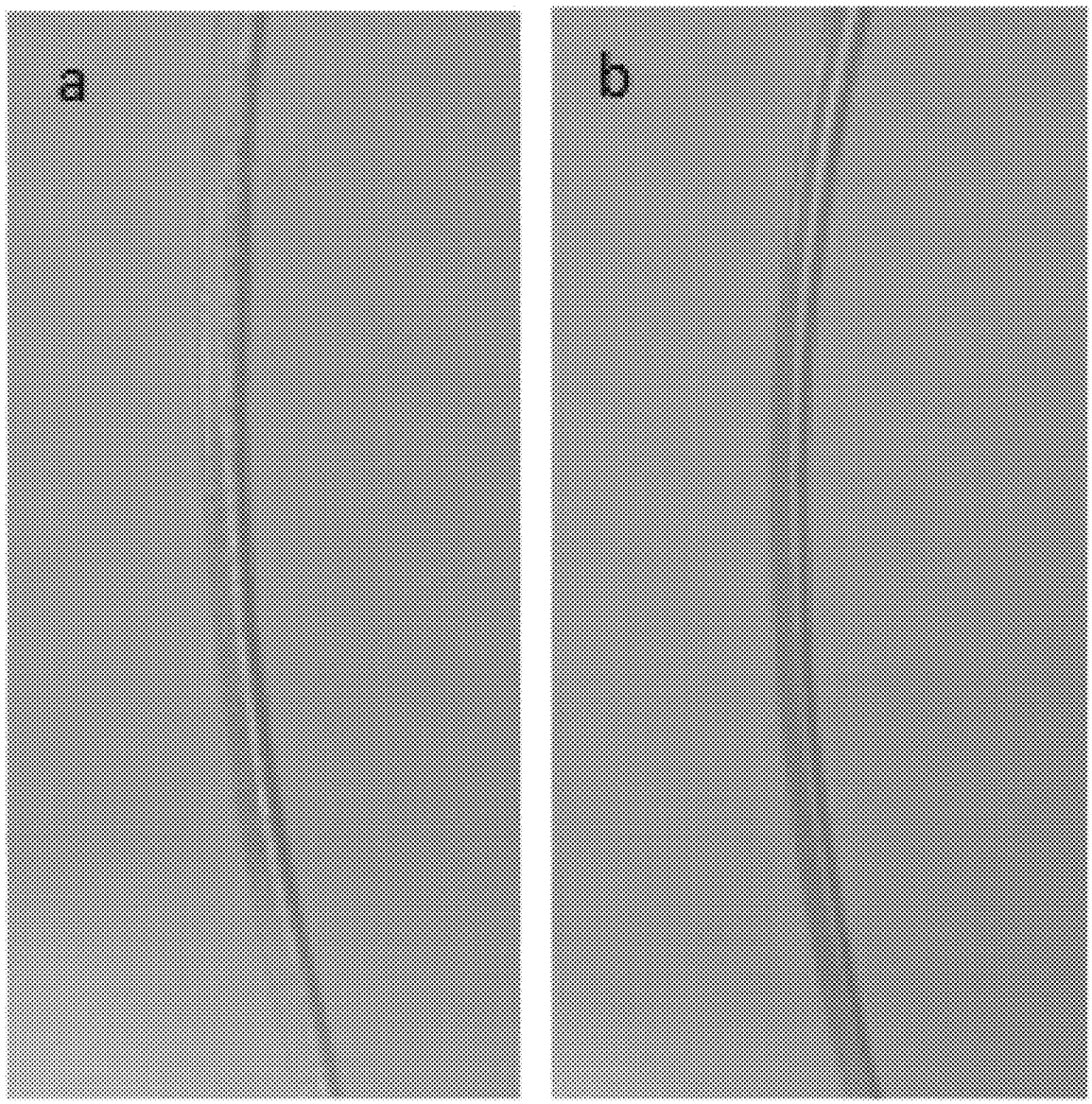
FIG. 8 is taken from FIG. 4 in MURPHY et al., Microcrystalline Cellulose Reinforced Polylactic Acid Biocomposite Filaments for 3D Printing, Polymer Composites, 2018, 1311-1320, Vol. 39(4)
Figure 9:
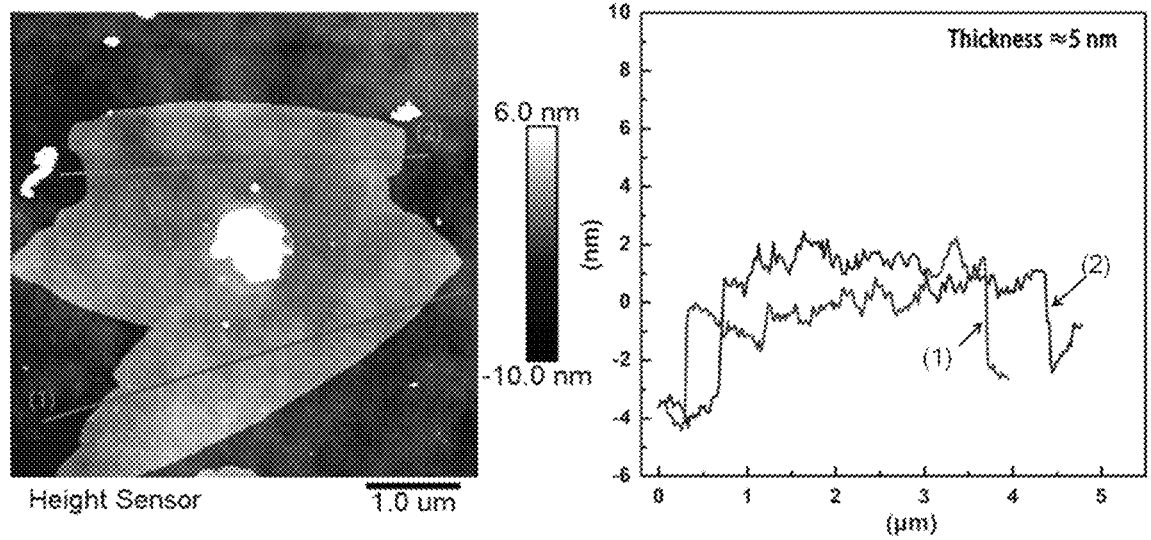
FIG. 9 is an exemplary thickness of two-dimensional cellulose prepared with the present invention.
Figure 10:
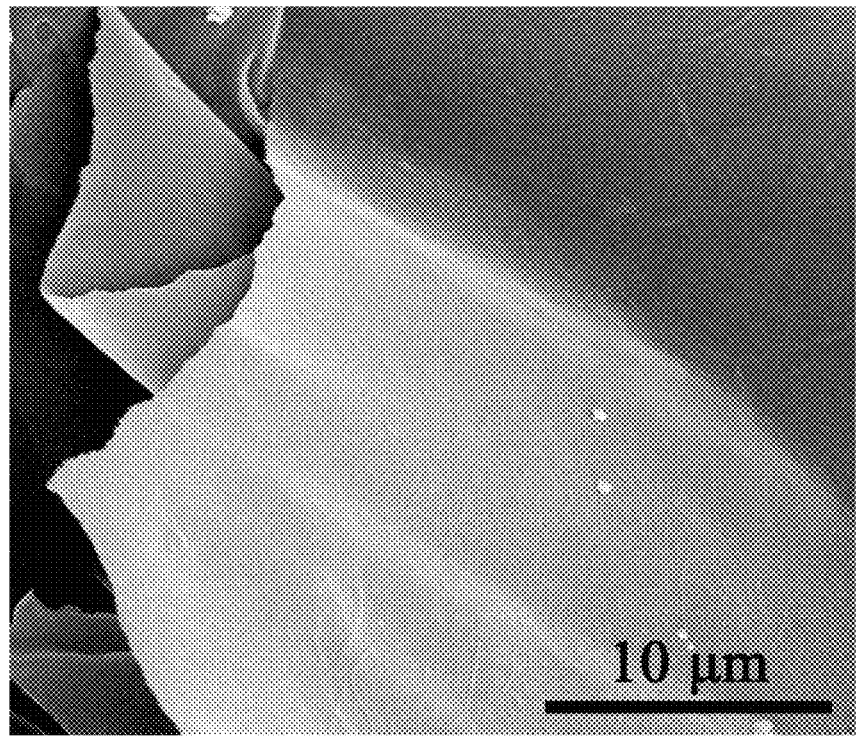
FIG. 10 is a scanned electron microscopy (SEM) image of two-dimensional cellulose prepared with the present invention.
Figure 11:
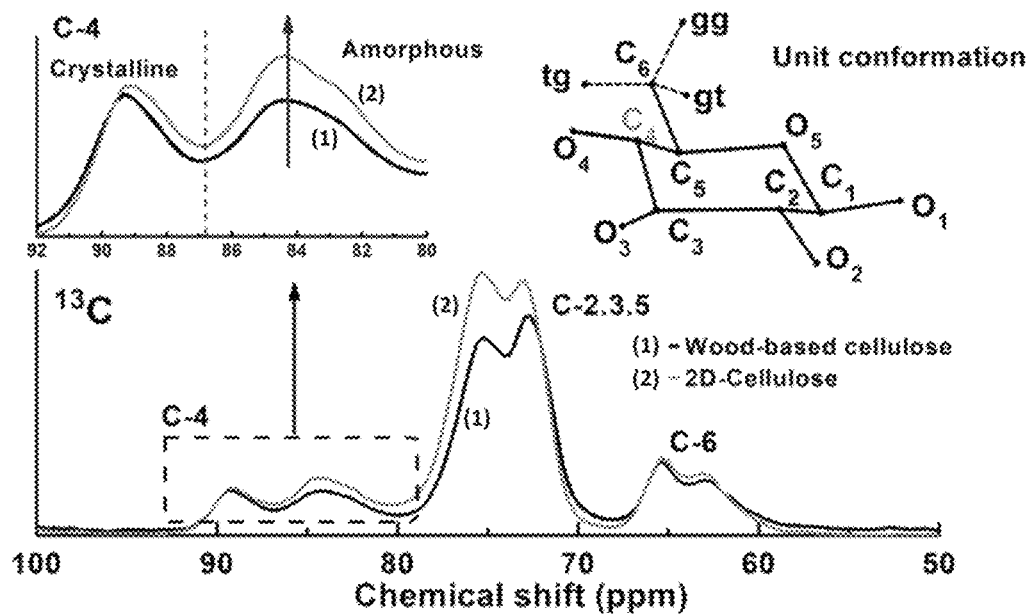
FIG. 11 is a comparative diagram of degrees of crystallization of two-dimensional cellulose prepared with the present invention and lignocellulose paper.
Figure 12:
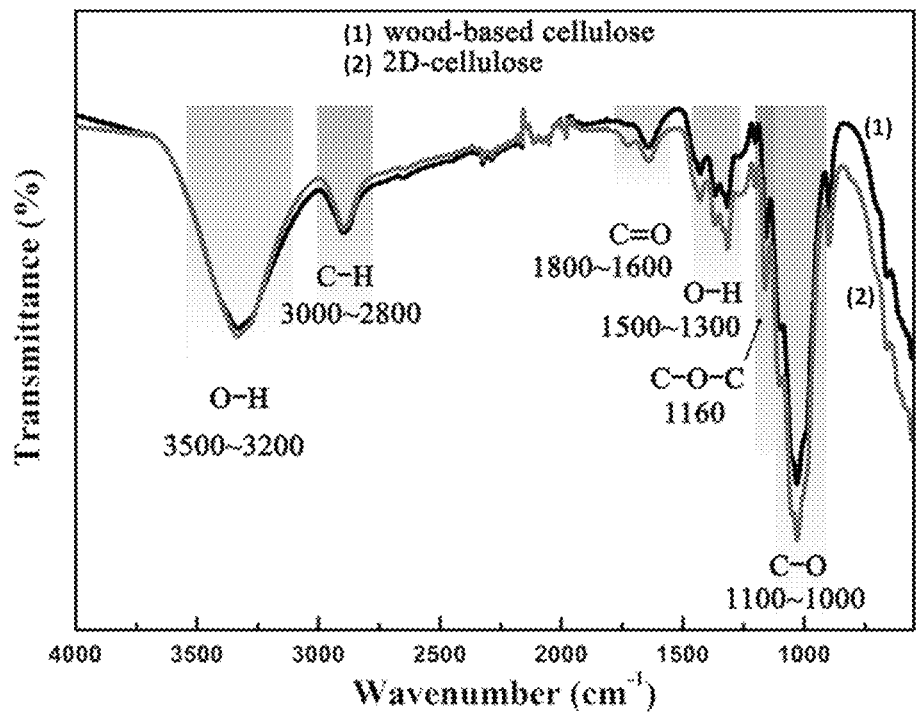
FIG. 12 is a comparative diagram of chemical structures of two-dimensional cellulose prepared with the present invention and traditional cellulose.
Figure 13:
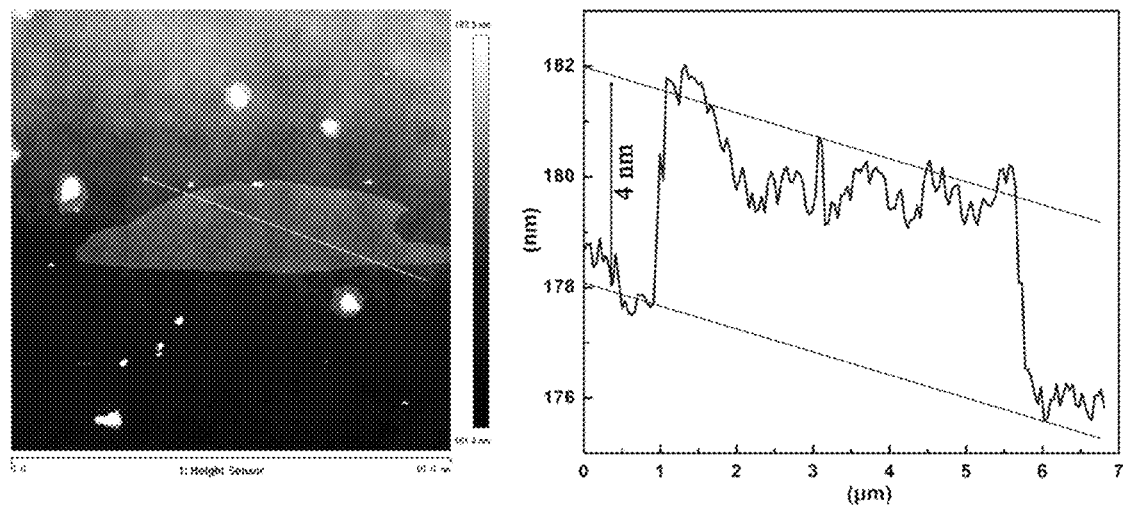
FIG. 13 is an atomic force microscope (AFM) image of the two-dimensional cellulose prepared in Embodiment 1 of the present invention.

FIG. 13 is an AFM image of the two-dimensional cellulose obtained in step 4 of this embodiment, which confirms that the two-dimensional cellulose can be obtained by this method and has a thickness of about 4 nanometers.

Embodiment 2

Figure 14:
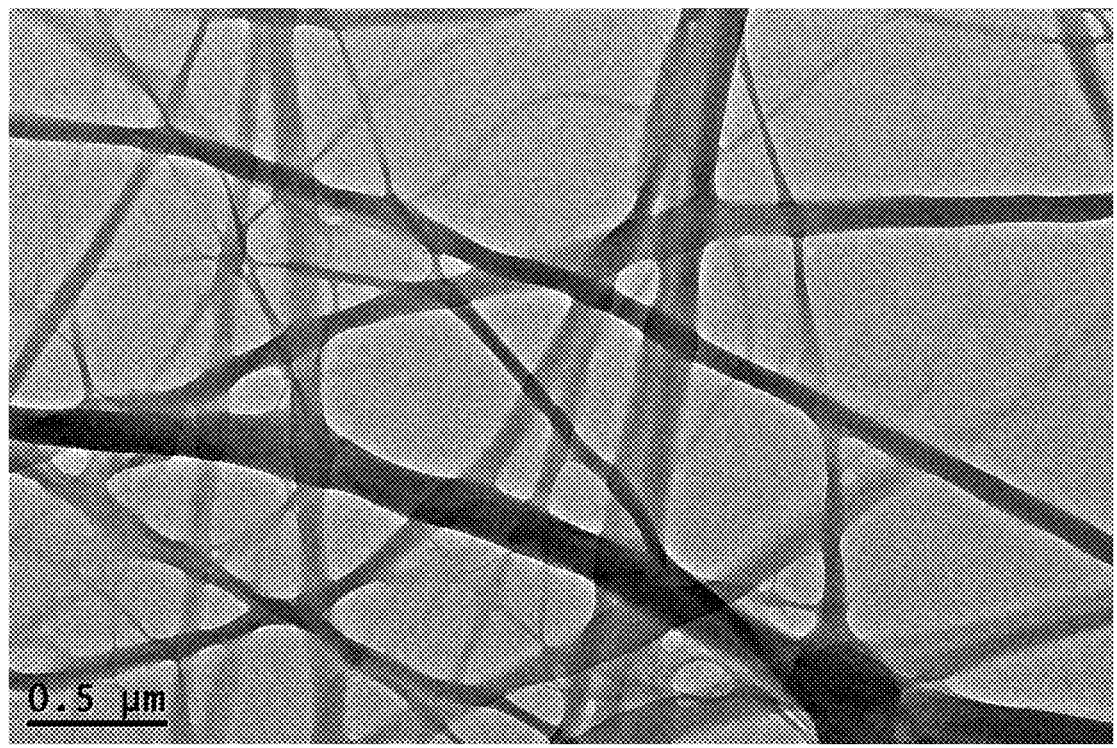
FIG. 14 is a transmission electron microscope (TEM) image of cellulose nano fibers with continuous branched structures prepared in step 1 of Embodiment 2 of the present invention.

(1) 50 grams of poplar cellulose was put into 1 liter of a mixed solvent of ethanol and water (1:1); and after 50 ml of formic acid (99.9%, Aladdin reagent) was added, ultrasonic treatment was performed at power of 200 W for 10 minutes to obtain ethanol/water suspension of cellulose nano fibers with continuous branched structures (FIG. 14).

(2) The ethanol and the formic acid in the suspension were replaced with water to obtain cellulose nano fiber aqueous suspension with continuous branched structures. The suspension was put in a container, and the temperatures of upper and lower ends were controlled to be 0° C. and −50° C. respectively under the assistance of ultra-low temperature liquid oxygen fluid fumigation, and a temperature difference was 50° C., so as to control the crystallization rate of the mixed suspension. After being completely frozen, the suspension was put into a freeze dryer for freeze drying at −40° C. for 80 hours to obtain crude two-dimensional cellulose (FIG. 15).

Figure 16:
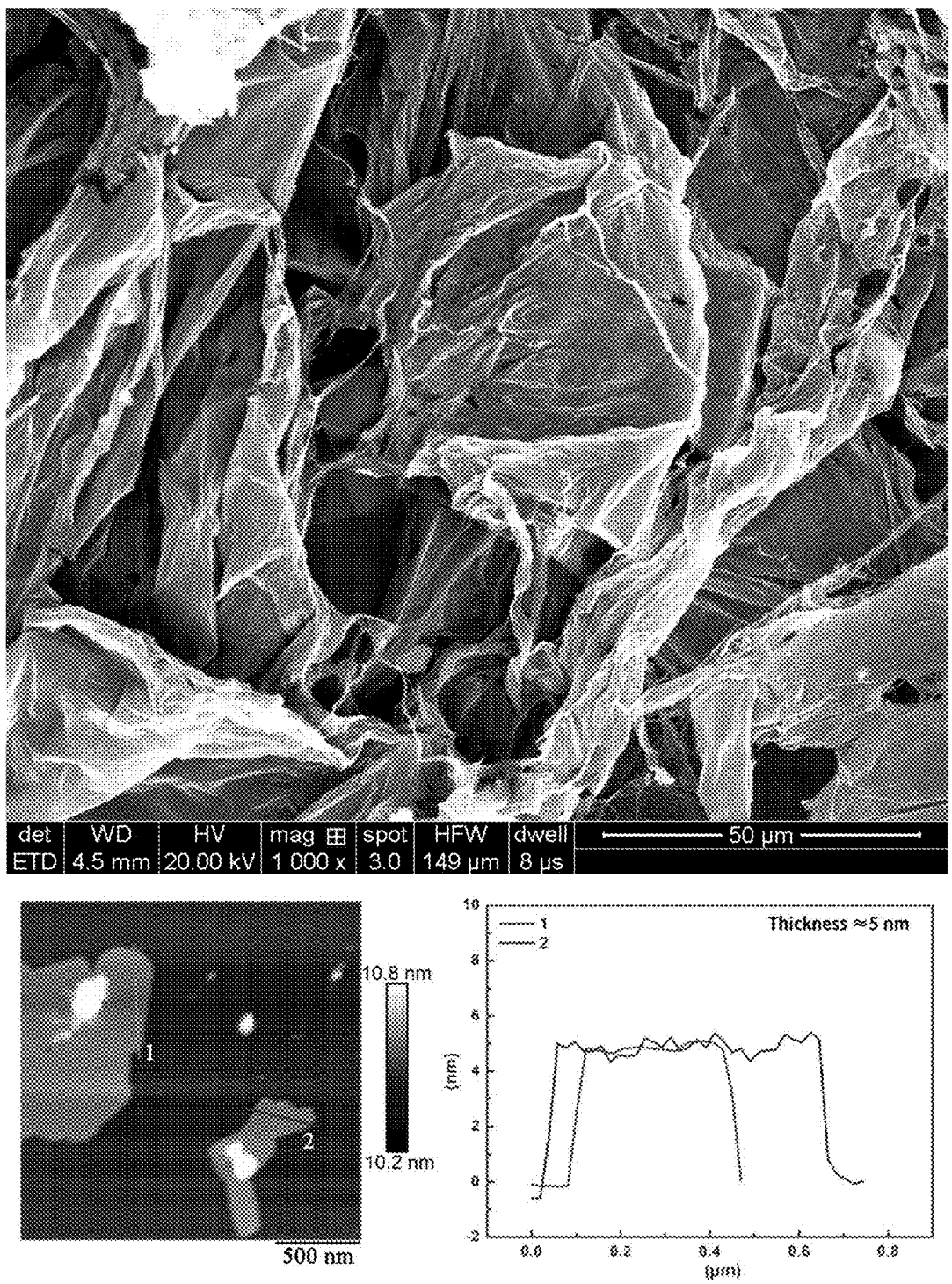
FIG. 16 is an SEM image and an AFM image of high-quality two-dimensional cellulose prepared in step 3 of Embodiment 2 of the present invention.

(3) Steps (1) and (2) were repeated for three times on the obtained crude two-dimensional cellulose to obtain high-quality two-dimensional cellulose (a and b in FIG. 16).

FIG. 14 is a TEM image of the cellulose nano fibers with continuous branched structures prepared in step 1 of this embodiment, showing that the cellulose nano fibers have the continuous branched structures.

Figure 15:
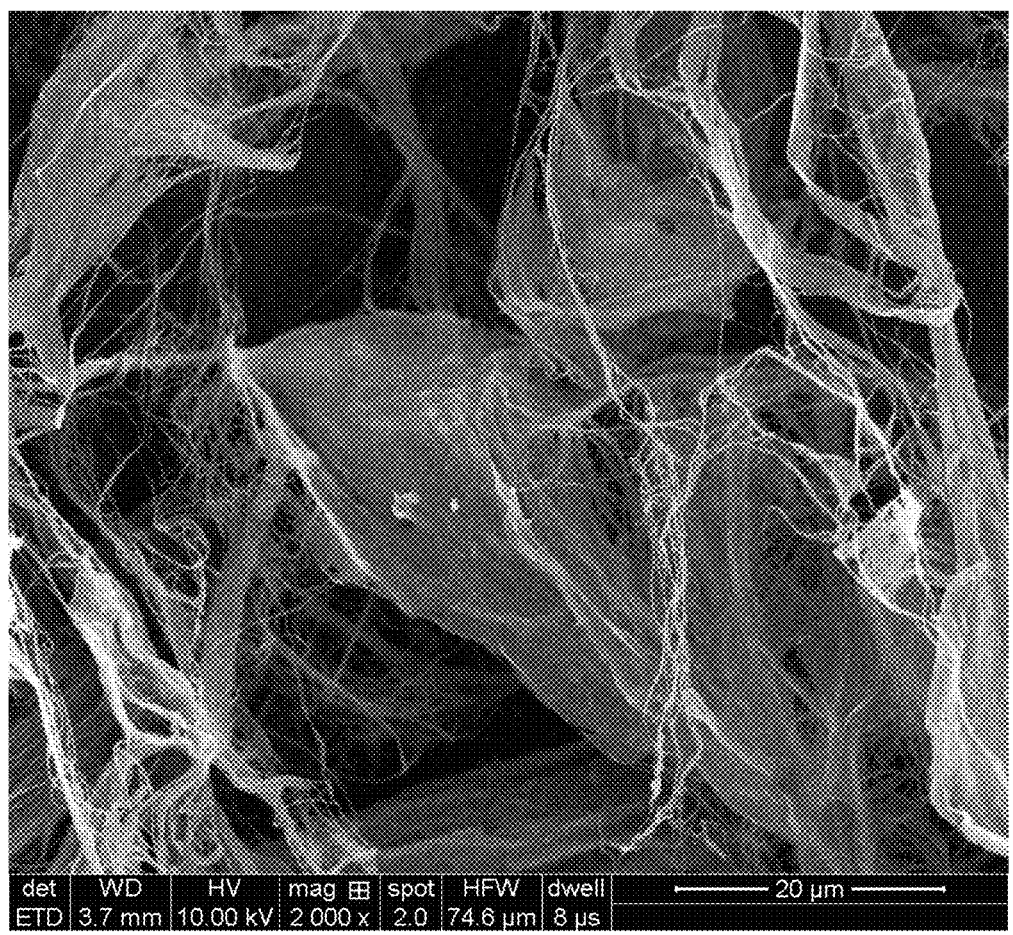
FIG. 15 is a SEM image of crude two-dimensional cellulose prepared in step 2 of Embodiment 2 of the present invention.

FIG. 15 is an SEM image of the crude two-dimensional cellulose prepared in step 2 of this embodiment, showing that only part of the crude two-dimensional cellulose is transformed into two-dimensional cellulose.

FIG. 16 shows an SEM image and an AFM image of the high-quality two-dimensional cellulose obtained in step 3 of this embodiment, showing that the cellulose has been completely transformed into a 2D structure with a thickness of 5 nanometers.

Embodiment 3

(1) Manganese dioxide nanoflower powder with a volume fraction of 1.0 [about 60 nanometers; prepared according to the method in LIU et al., One-step Synthesis of Single-Layer $MnO_2$ Nanosheets with Multi-Role Sodium Dodecyl Sulfate for High-Performance Pseudocapacitors, small, 2015, Vol. 11(18), which is incorporated herein by reference in its entirety] was added to aqueous suspension of two-dimensional cellulose (which was extracted and processed from the moso bamboo, and had a thickness of 3-5 nanometers) with a concentration of 6 g/L; ultrasonic dispersion was performed for 30 minutes; and the temperature was controlled at 10° C.

(2) The manganese dioxide nanoflower/two-dimensional cellulose suspension was put in a container, and the temperatures of upper and lower ends were controlled to be 5° C. and −45° C. respectively under the assistance of ultra-low temperature liquid oxygen fluid fumigation, and a temperature difference was 50° C., so as to control the crystallization rate of the mixed suspension. After being completely frozen, the suspension was put into a freeze dryer for freeze drying at −50° C. for 64 hours to obtain a manganese dioxide nanoflower powder-assembled composite micro-nano fiber.

Figure 17:
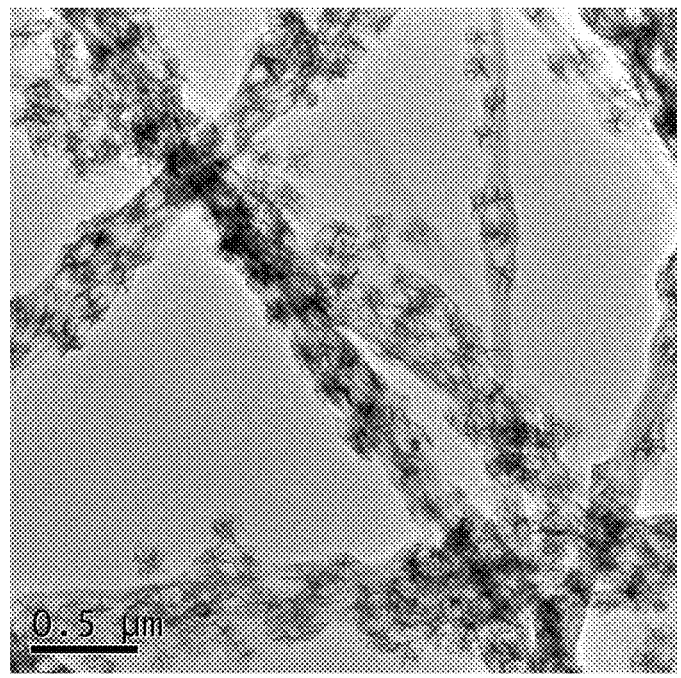
FIG. 17 is a TEM image of a manganese dioxide nanoflower powder-assembled composite micro-nano fiber prepared in Embodiment 3 of the present invention.

FIG. 17 is a TEM image of the manganese dioxide nanoflower powder-assembled composite micro-nano fiber prepared in this embodiment. This figure shows that the manganese dioxide nanoflower structure in the fiber is intact.

Figure 18:
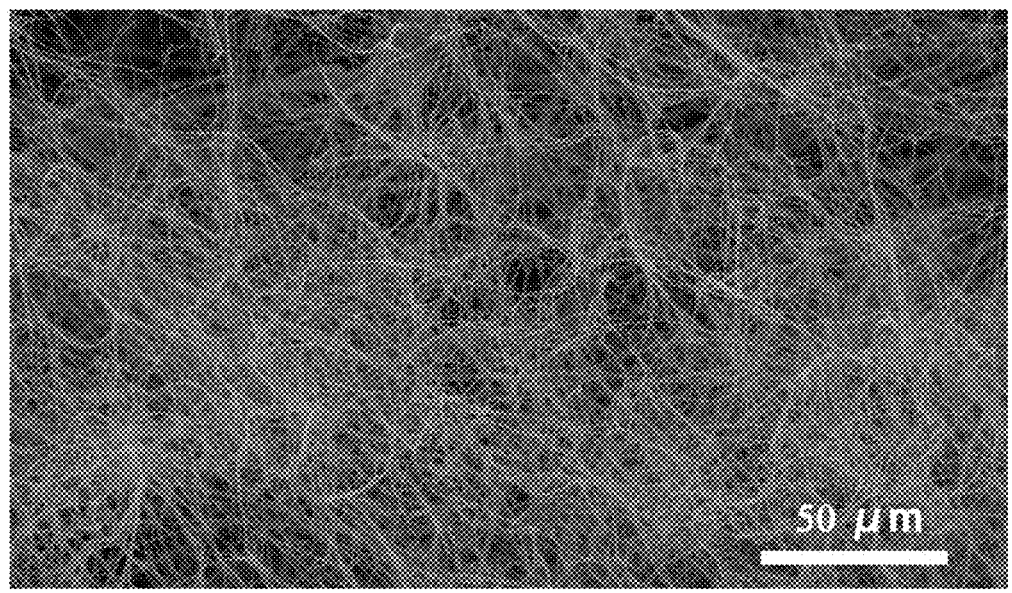
FIG. 18 is an SEM image of a manganese dioxide nanoflower powder-assembled composite micro-nano fiber prepared in Embodiment 3 of the present invention.

FIG. 18 is an SEM image of the manganese dioxide nanoflower powder-assembled composite micro-nano fiber prepared in this embodiment. This figure shows that the structural form of the manganese dioxide nanoflower powder-assembled composite micro-nano fiber is intact, and all the fibers are of a fibrous structure.

Embodiment 4

(1) Nano iron oxide powder (30 nanometers, Aladdin reagent) with a volume fraction of 2.0 was added into aqueous solution of two-dimensional cellulose (which was extracted from basswood and had a thickness of 3-5 nanometers) with a concentration of 5 g/L; ultrasonic dispersion was performed for 15 minutes, and the temperature was controlled at 15° C.

(2) The nano iron oxide/two-dimensional cellulose mixed suspension prepared in step (1) was put into a container, and the temperatures of upper and lower layers were controlled to be 20° C. and −80° C. respectively under the assistance of ultra-low temperature liquid helium fluid fumigation, and a temperature difference was 100° C., so as to control the crystallization rate of the mixed suspension. After being completely frozen, the suspension was put into a freeze dryer for freeze drying at −40° C. for 80 hours to obtain a nano iron oxide powder-assembled composite micro-nano fiber.

(3) The nano iron oxide powder-assembled composite micro-nano fiber prepared in step (2) was twisted into a thread to obtain a nano iron oxide thread with a diameter of hundreds of micrometers.

Figure 19:
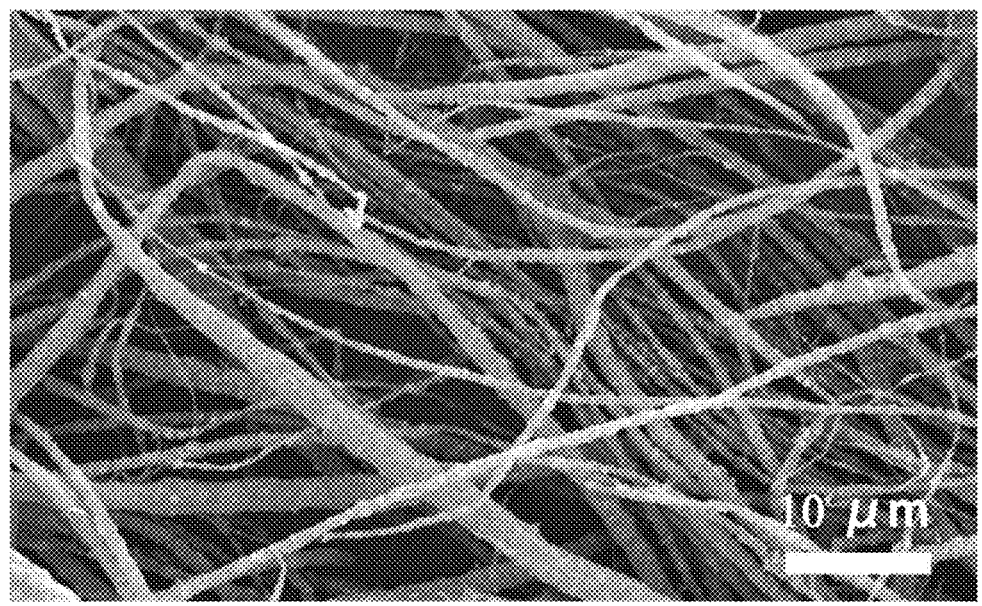
FIG. 19 is an SEM image of a nano iron oxide-assembled composite micro-nano fiber prepared in Embodiment 4 of the present invention.

FIG. 19 is an SEM image of the nano iron oxide-assembled composite micro-nano fiber prepared in step (2) of this embodiment. This figure shows that the structural form of the nano iron oxide-assembled composite micro-nano fiber is intact, and all the fibers are of a fibrous structure.

Figure 20:
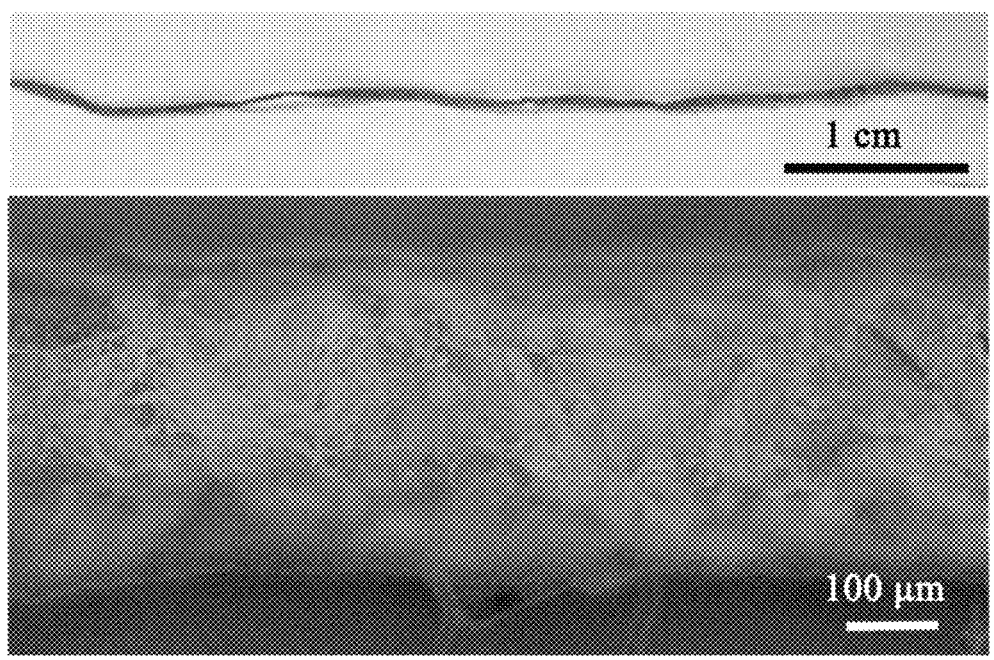
FIG. 20 is an optical microscope image of a nano iron oxide thread prepared in Embodiment 4 of the present invention.

FIG. 20 is an optical microscope image of the nano iron oxide thread prepared in step (3) of this embodiment. It is confirmed that the micro-nano fiber prepared in this embodiment can be further processed.

Embodiment 5

(1) Carbon nano tubes, titanium carbide, molybdenum sulfide, manganese dioxide, nickel, silicon dioxide, diamond, silicon nitride, zinc-MOF and gadolinium oxide ten-element nano mixed powder (in which powder of each component had a size distribution of 30 nanometers to 5 micrometers, and was purchased from Aladdin and McLean and prepared in a laboratory) with a total volume fraction of 1.0 was added into tert-butanol suspension of two-dimensional cellulose (which was extracted and processed from poplar and had a thickness of 3-5 nanometers) with a concentration of 2 g/L; ultrasonic dispersion was performed for 10 minutes, and the temperature was controlled at 10° C.

(2) The ten-element mixed powder/two-dimensional cellulose mixed suspension prepared in step (1) was put into a container, and the temperatures of upper and lower layers were controlled to be 0° C. and −98° C. respectively under the assistance of ultra-low temperature liquid nitrogen fluid fumigation, and a temperature difference was 98° C., so as to control the crystallization rate of the mixed suspension. After being completely frozen, the suspension was put into a freeze dryer for freeze drying at −40° C. for 64 hours to obtain a ten-element mixed powder-assembled composite micro-nano fiber.

Figure 21:
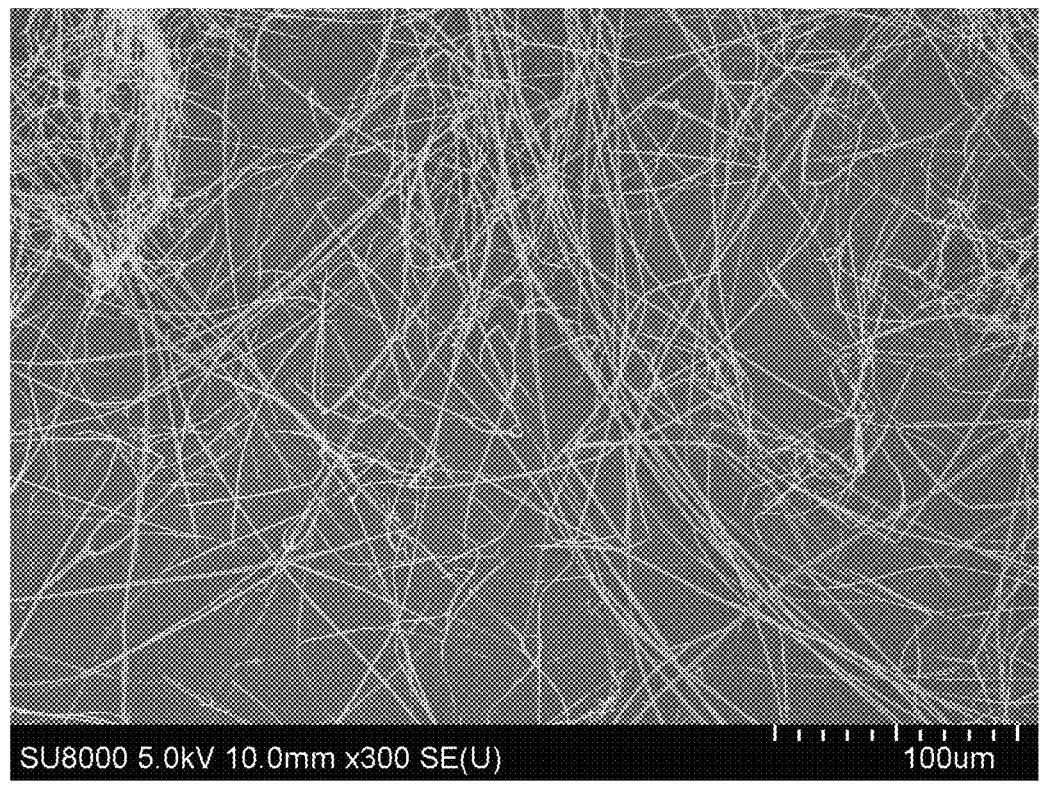
FIG. 21 is an SEM image of a ten-element mixed powder-assembled composite micro-nano fiber prepared in Embodiment 5 of the present invention.

FIG. 21 is an SEM image of the ten-element mixed powder-assembled composite micro-nano fiber prepared in this embodiment. This figure shows that the structural form of the composite micro-nano fiber is intact; there is no powder residue; and the forming effect is excellent.

Figure 22:
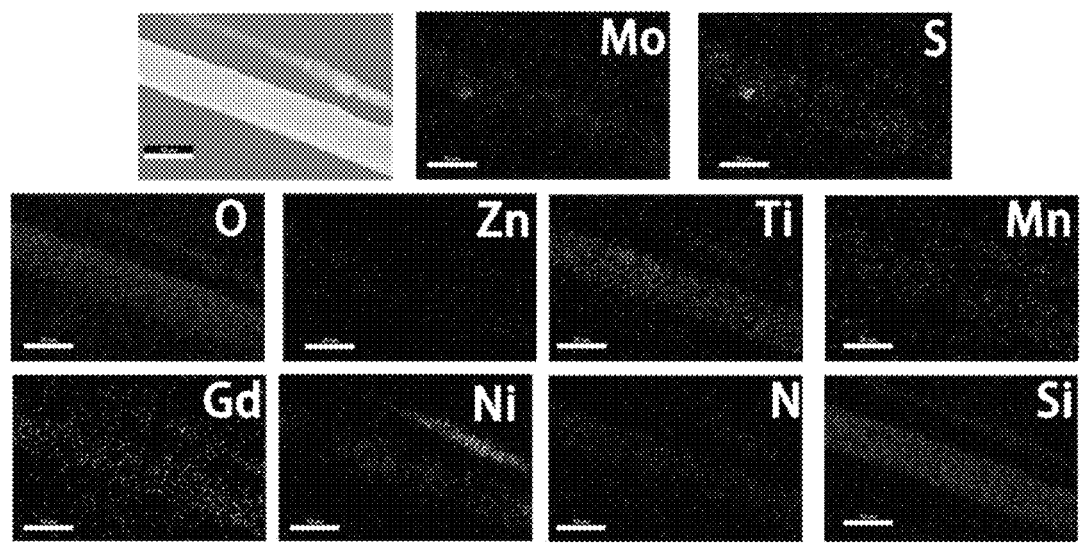
FIG. 22 is an element distribution diagram corresponding to the SEM image of the ten-element mixed powder-assembled composite micro-nano fiber prepared in Embodiment 5 of the present invention.

FIG. 22 is an element distribution diagram corresponding to the SEM image of the ten-element mixed powder-assembled composite micro-nano fiber prepared in this embodiment. This figure shows that the various kinds of powder are distributed uniformly in the figure and are not agglomerated, which has confirmed that this method has no requirement for the physiochemical properties of the powder.

Embodiment 6

A 46-representative-powder-assembled composite micro-nano fiber was prepared according to the same method as that in Embodiment 1. 46 kinds of representative powder include a metal element, a non-metal element, an oxide, a carbide, a nitride, a sulfide, a phosphide and an organic matter. Specifically, the 46 kinds of representative powder include: tungsten powder, niobium powder, nickel powder, titanium powder, molybdenum powder, tantalum powder, carbon powder, silicon powder, diamond, silver powder, iron powder, chromium oxide, tungsten oxide, hydroxyapatite, holmium oxide, barium titanate, indium oxide, nickel oxide, zinc oxide, aluminum oxide, silicon dioxide, cerium oxide, magnesium oxide, strontium titanate, samarium oxide, gadolinium oxide, iron oxide, lithium iron phosphate, manganese dioxide, tin antimony oxide, zirconium oxide, zinc ferrite, copper oxide, zirconium carbide, silicon carbide, titanium carbide, tungsten carbide, silicon nitride, titanium nitride, molybdenum sulfide, tungsten sulfide, germanium phosphide, zinc-MOF, polypyrrole, iron-MOF and polystyrene.

Figure 23:
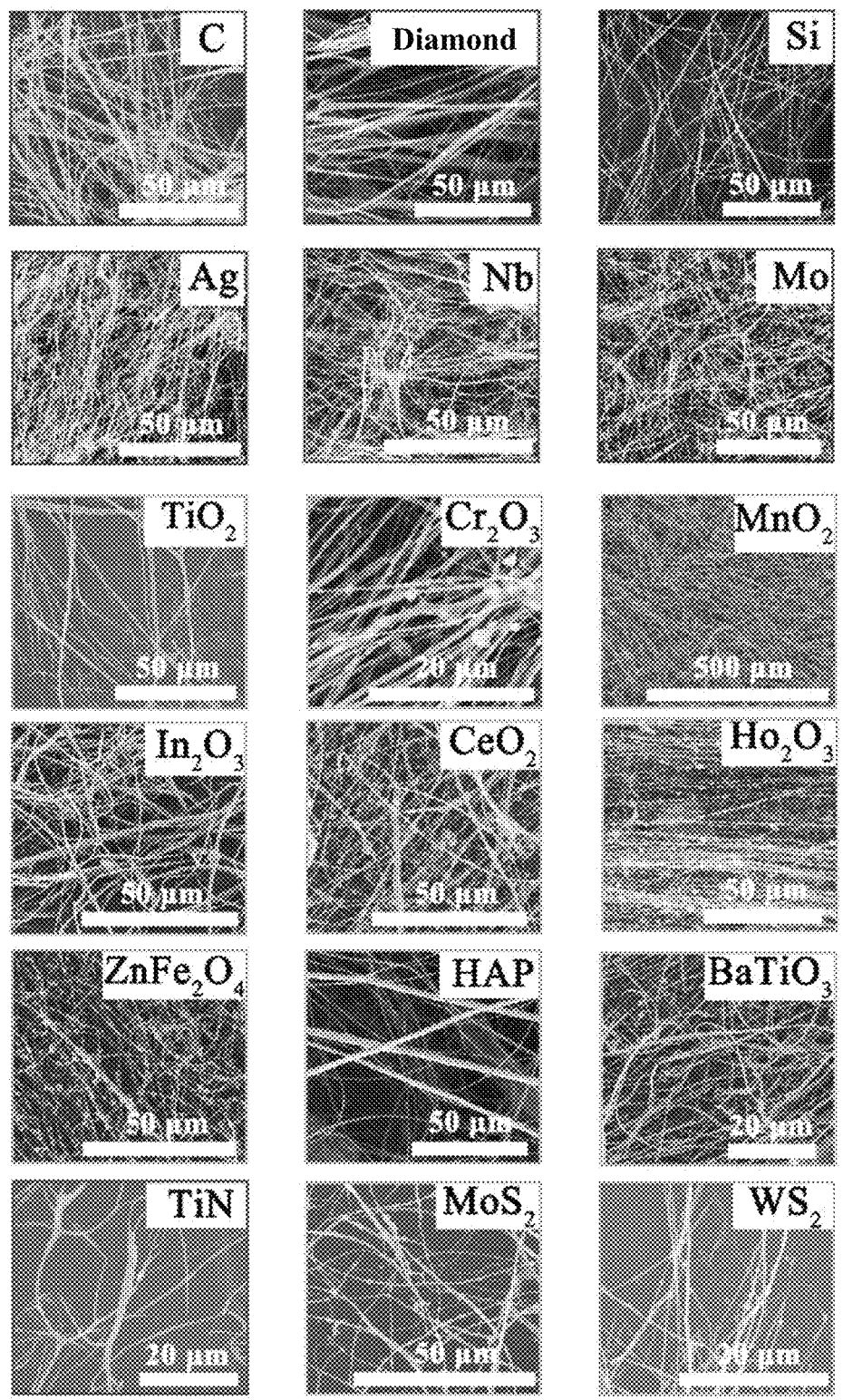
FIG. 23, FIG. 24 and FIG. 25 are SEM images of 46-representative-powder-assembled composite micro-nano fibers prepared in Embodiment 6 of the present invention.
Figure 24:
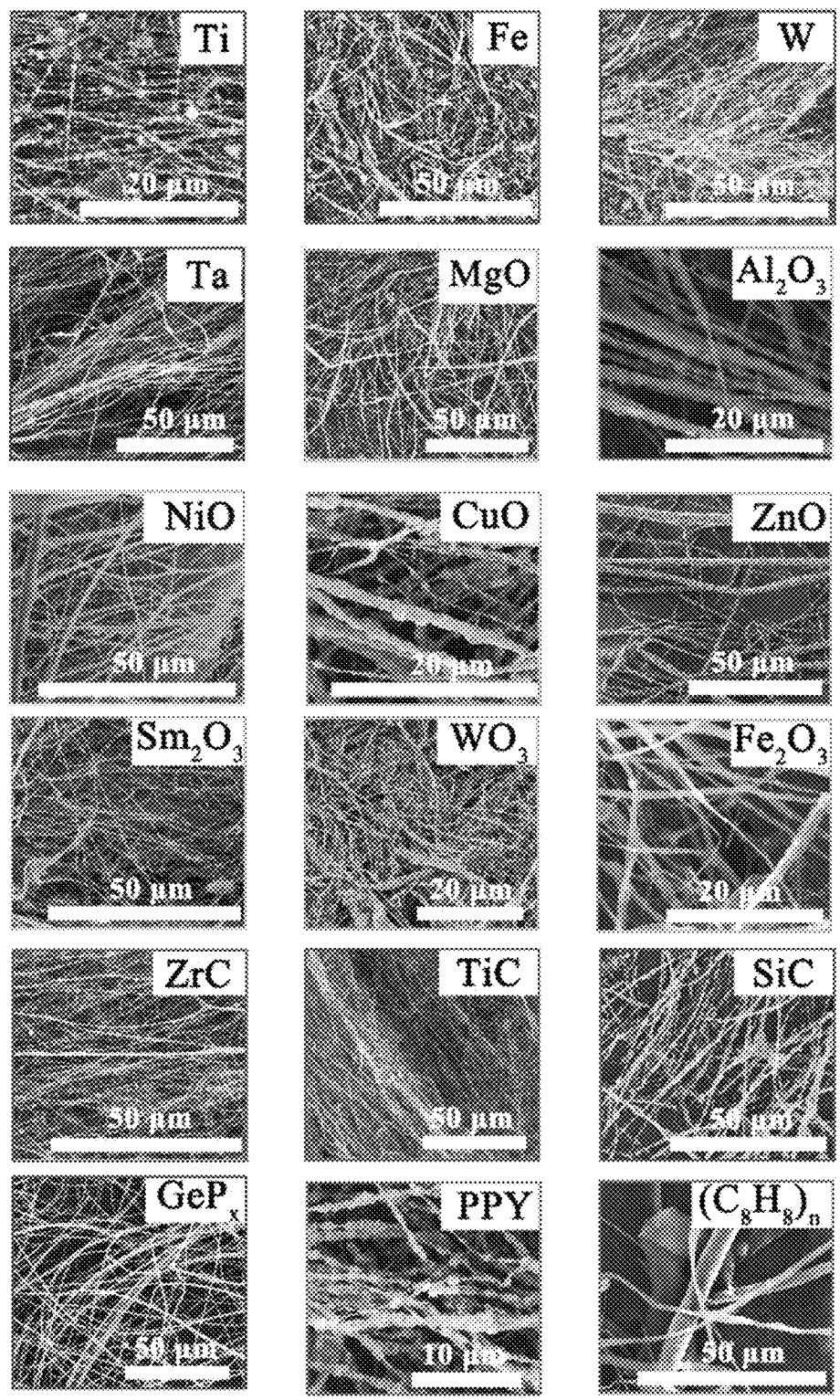
Figure 25:
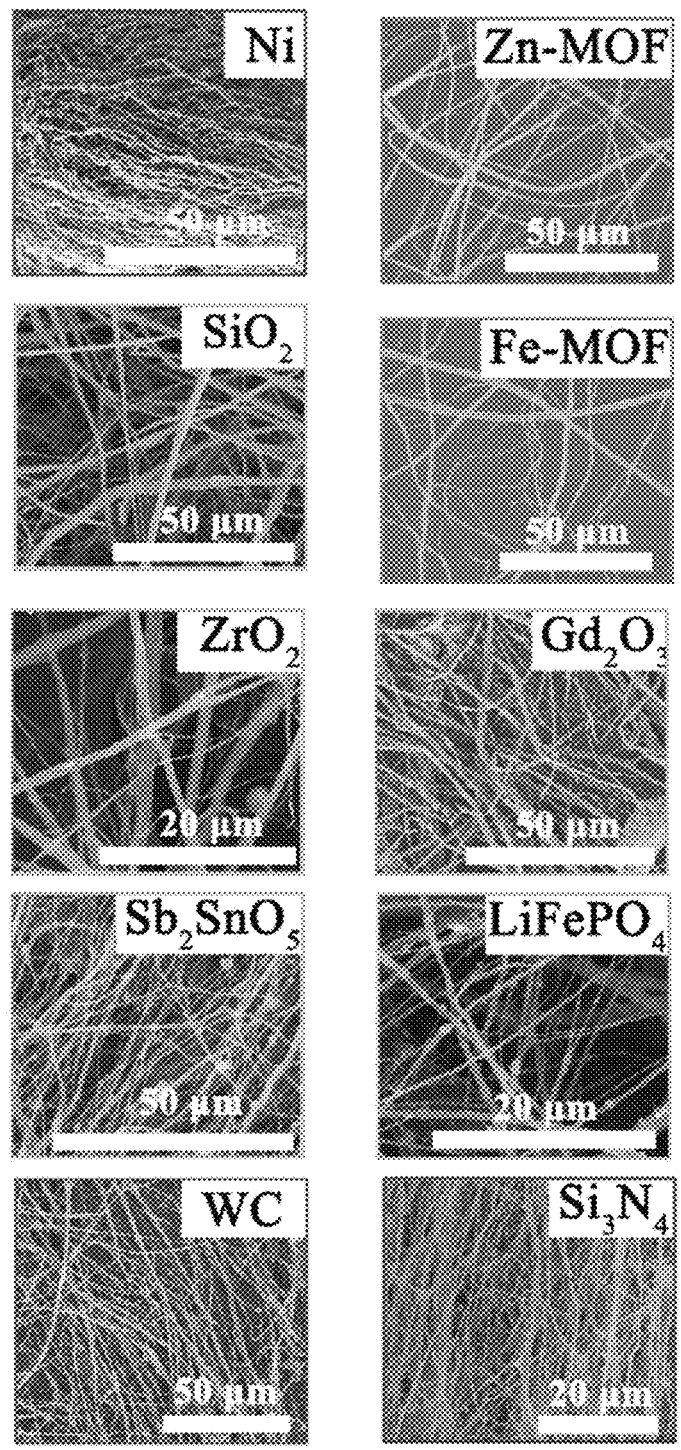

FIG. 23, FIG. 24 and FIG. 25 show the SEM images of the 46-representative-powder-assembled composite micro-nano fiber. A result shows that these materials can well form fibrous structures.

Figure 26:
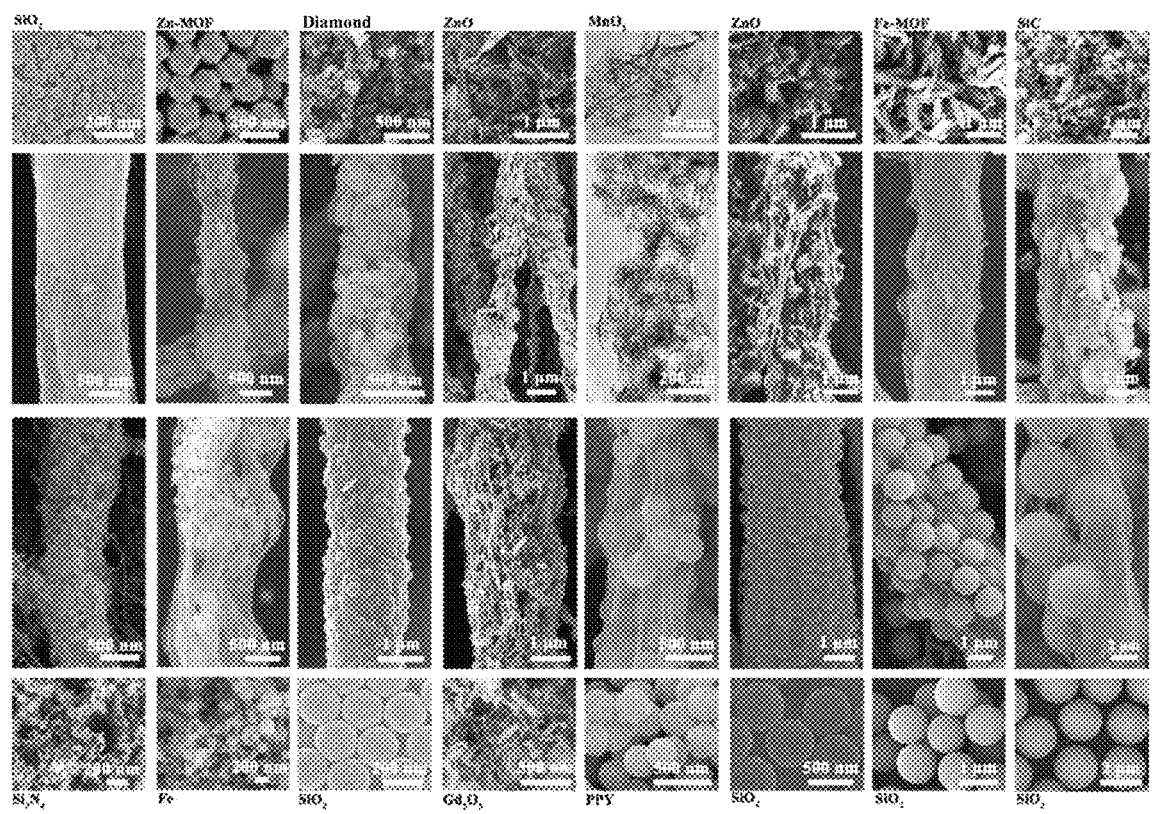
FIG. 26 is an SEM enlarged view of 16-representative-powder-assembled composite micro-nano fibers prepared in Embodiment 6.
Figure 27:
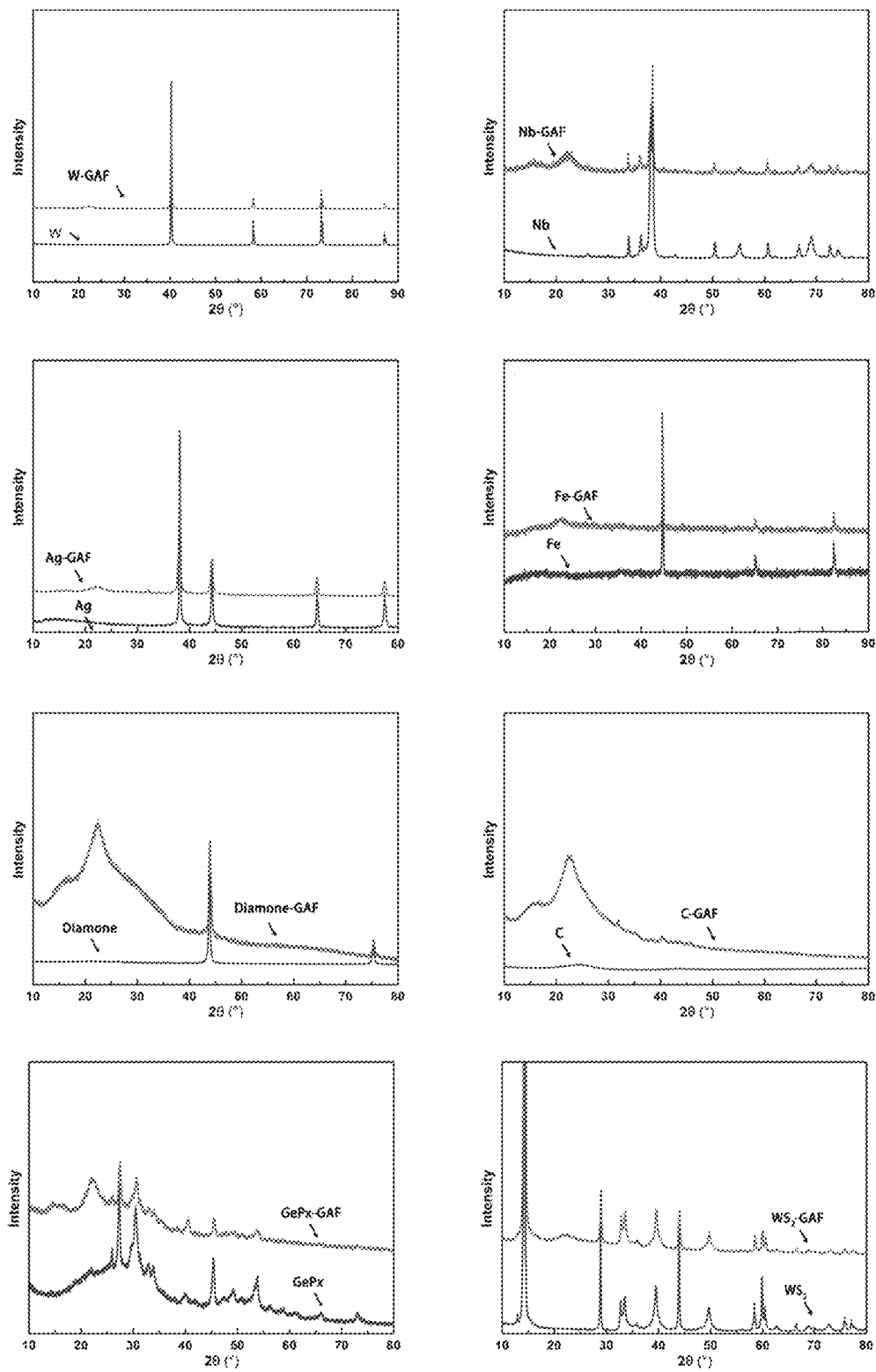
FIG. 27, FIG. 28, FIG. 29, FIG. 30, FIG. 31 and FIG. 32 are X-Ray Diffraction (XRD) images of representative powder materials before being assembled and after being assembled into a composite micro-nano fiber in Embodiment 6 of the present invention.
Figure 28:
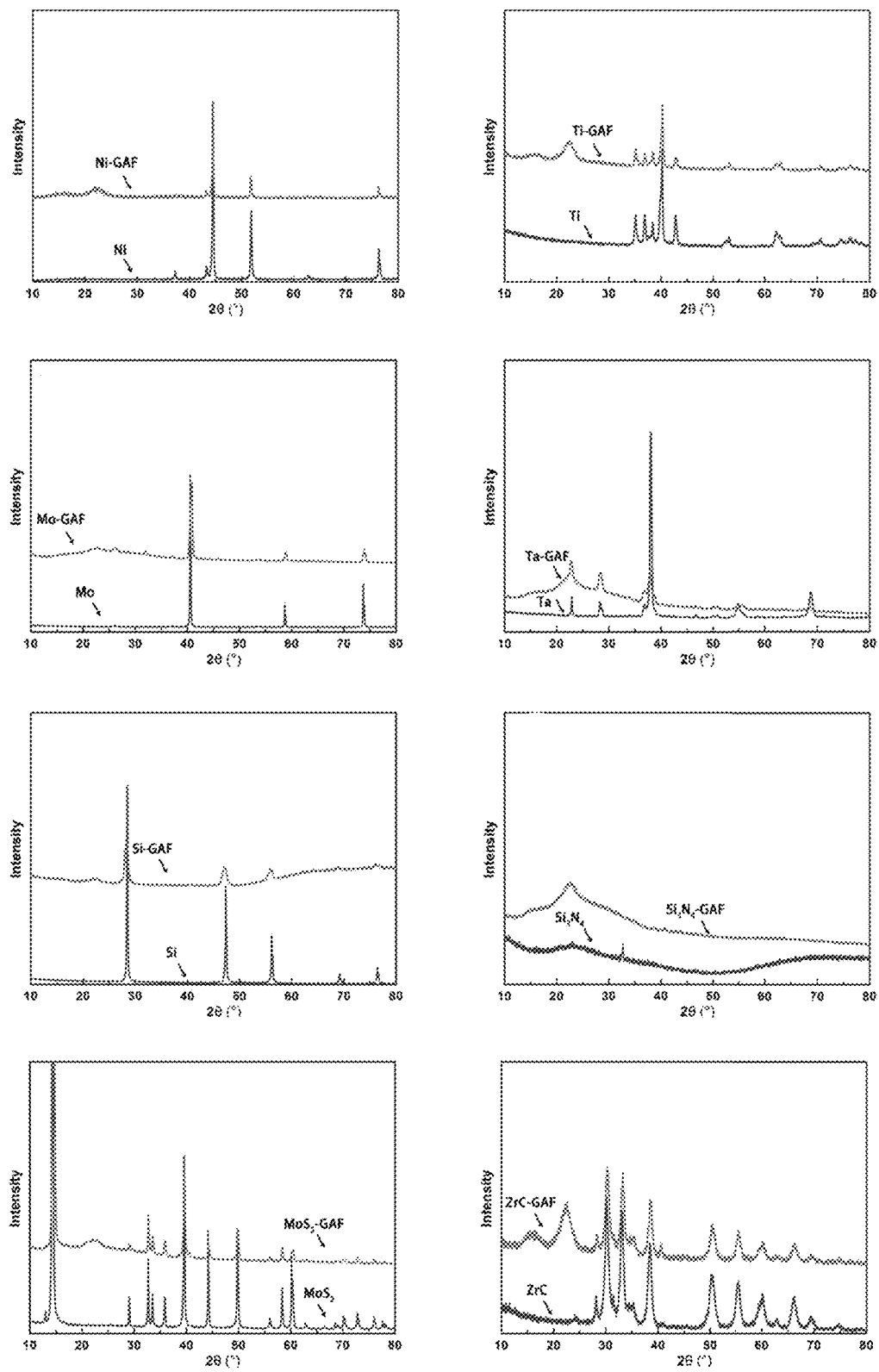
Figure 29:
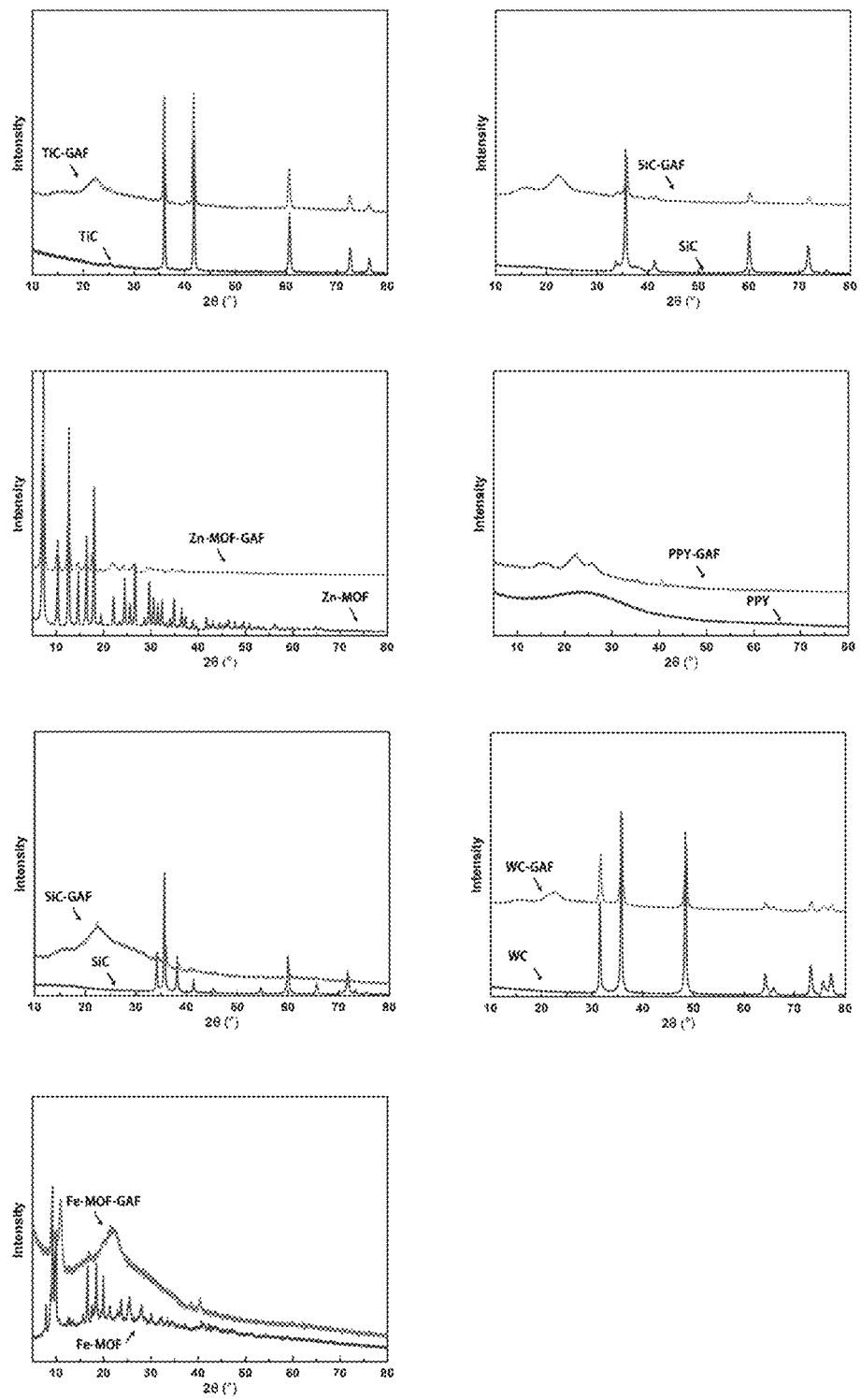
Figure 30:
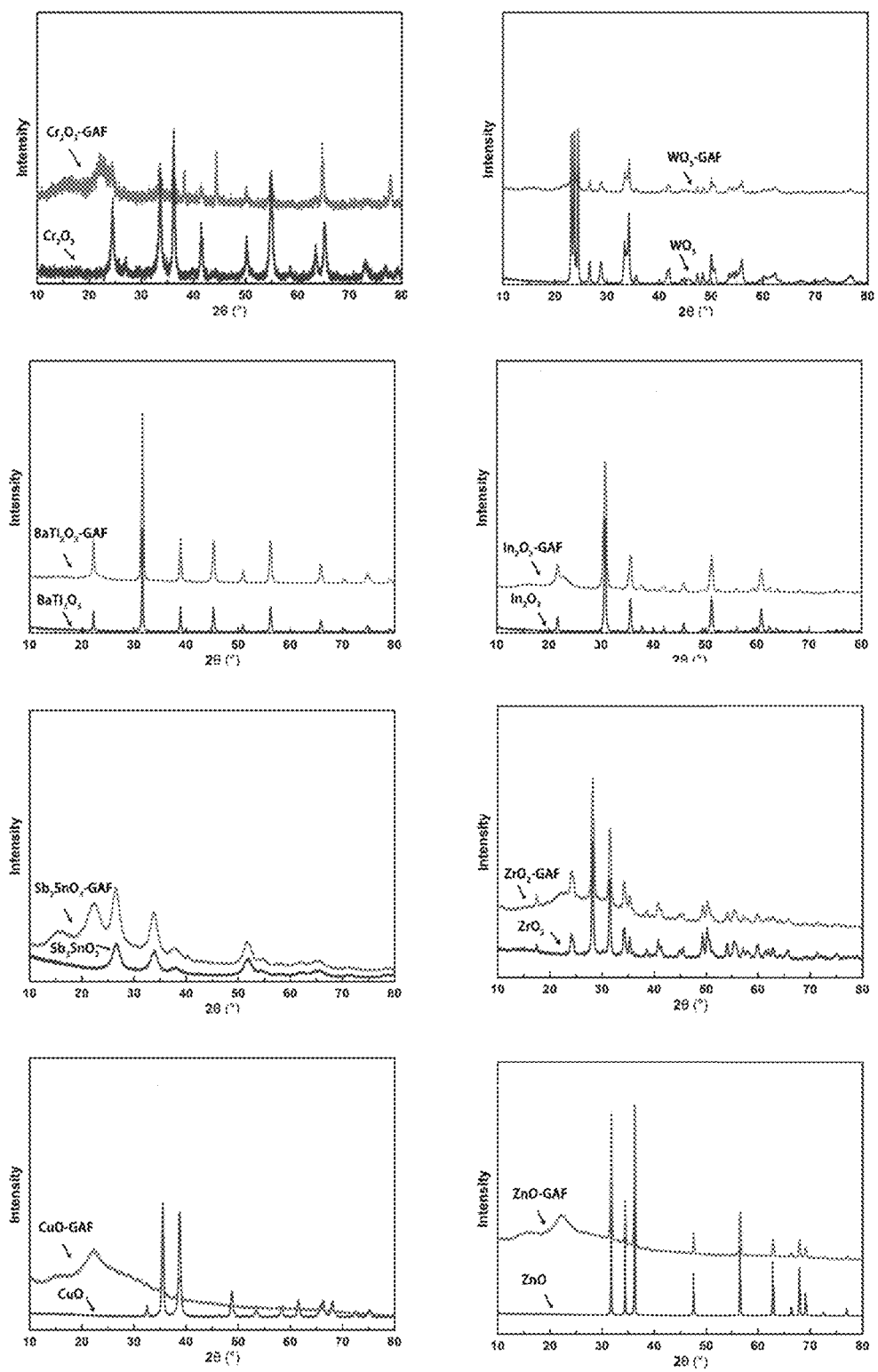
Figure 31:
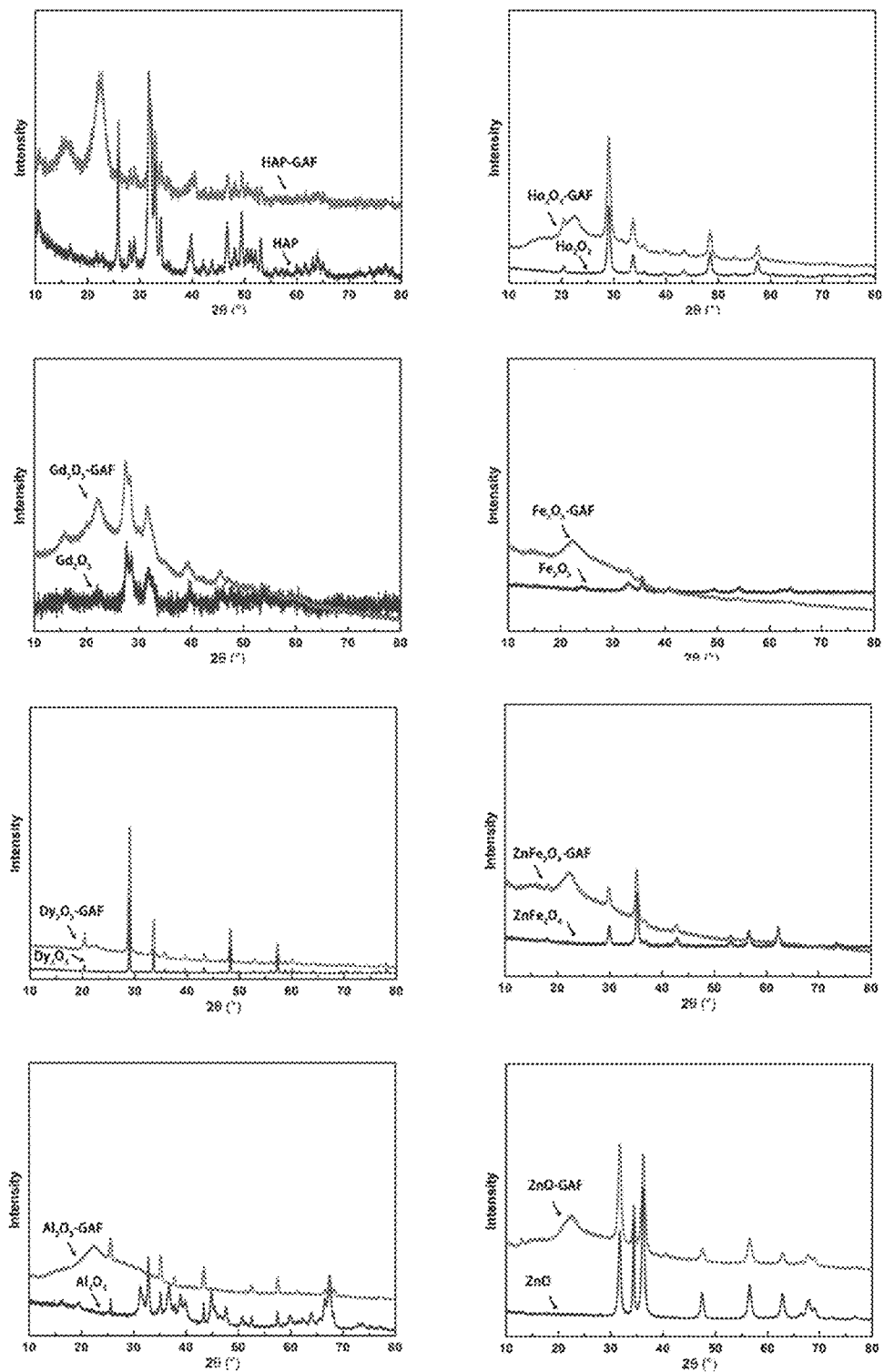
Figure 32:
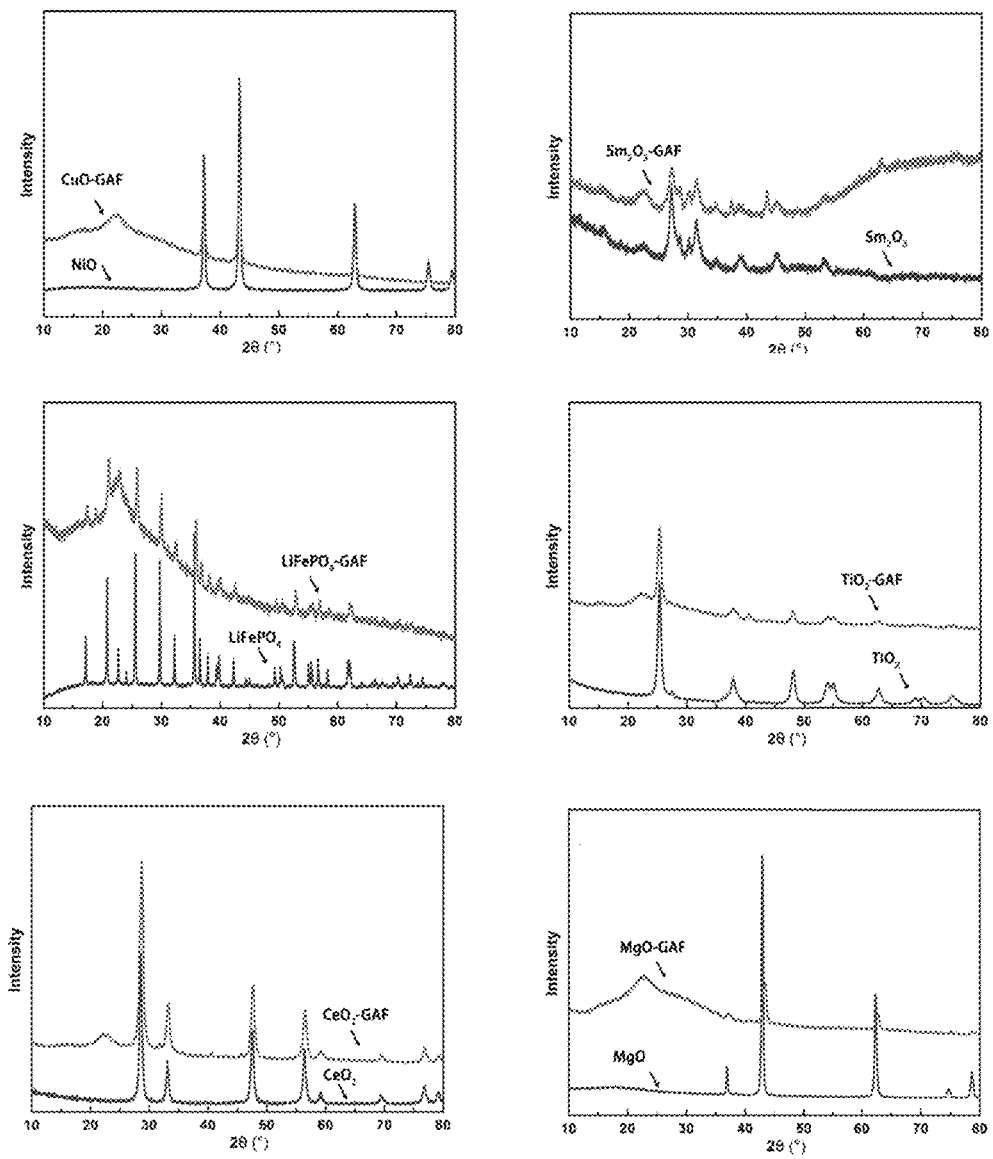

FIG. 26 is an SEM enlarged view of a 16-representative-powder-assembled composite micro-nano fiber in this embodiment. This figure shows that the microstructures of the powder are well retained in the fiber.

FIGS. 27-32 are XRD images of the representative powder materials in this embodiment before being assembled and after being assembled into a composite micro-nano fiber. According to the XRD images, a crystal structure of the powder material does not change before and after fibering.

Comparative Example 1

A zinc oxide powder-assembled composite micro-nano fiber was prepared according to the same method as that in Embodiment 1, and a difference lied in that a temperature difference between the upper end and the lower end in the freezing process of freeze drying in the step (2) was only 1° C.

Figure 39:
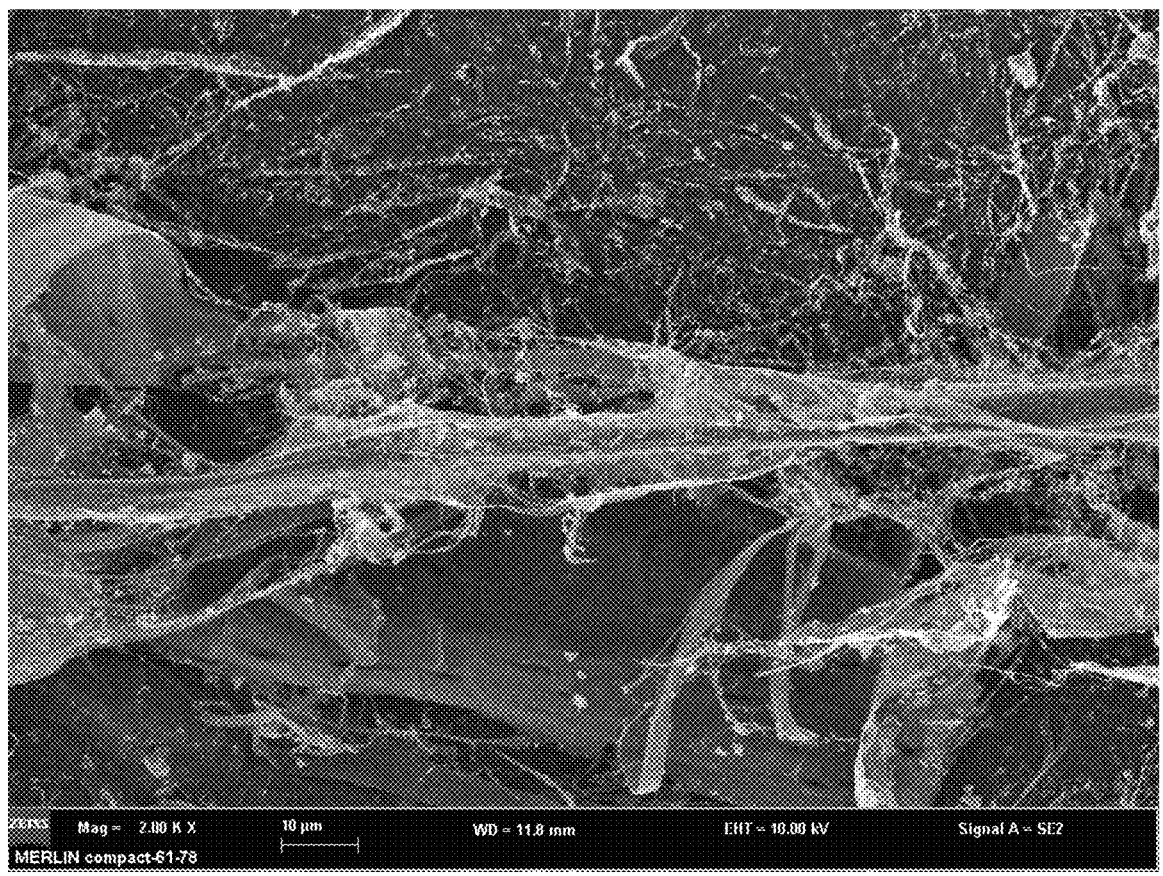
FIG. 39 is an SEM image of a zinc oxide powder-assembled composite micro-nano fiber prepared in comparative example 1 where a temperature difference is only 1° C.

A result is shown in FIG. 39. It can be seen by comparison with the result of Embodiments 1-4 that when the temperature difference between the upper end and the lower end is extremely small or there is no temperature difference, only a small part in the material is formed into a fiber, and most parts are still kept in the original flake structure.

Embodiment 7

(1) Mixed powder of a hydroxyapatite nanowire [Feynman (Liaoning Province)Nanomaterials Technology Co., Ltd.] and zinc-MOF (AVCI et al., Self-assembly of Polyhedral Metal-organic Framework Particles into Three-dimensional Ordered Superstructures, Nature Chemistry, 2018, 78-84, Vol. 10, which is incorporated herein by reference in its entirety) with a volume fraction of 5.0 was added into aqueous suspension of two-dimensional cellulose (which was extracted and processed from Acetobacter bacteria and had a thickness of 3-5 nanometers) with a concentration of 5 g/L; ultrasonic dispersion was performed for 15 minutes, and the temperature was controlled at 15° C.

(2) The hydroxyapatite nanowire/zinc-MOF/two-dimensional cellulose mixed suspension prepared in step (1) was put into a container, and the temperatures of upper and lower layers were controlled to be 20° C. and −80° C. respectively under the assistance of ultra-low temperature liquid helium fluid fumigation, and a temperature difference was 100° C., so as to control the crystallization rate of the mixed suspension. After being completely frozen, the suspension was put into a freeze dryer for freeze drying at −40° C. for 80 hours to obtain a hydroxyapatite nanowire/zinc-MOF powder-assembled composite micro-nano fiber.

Figure 33:
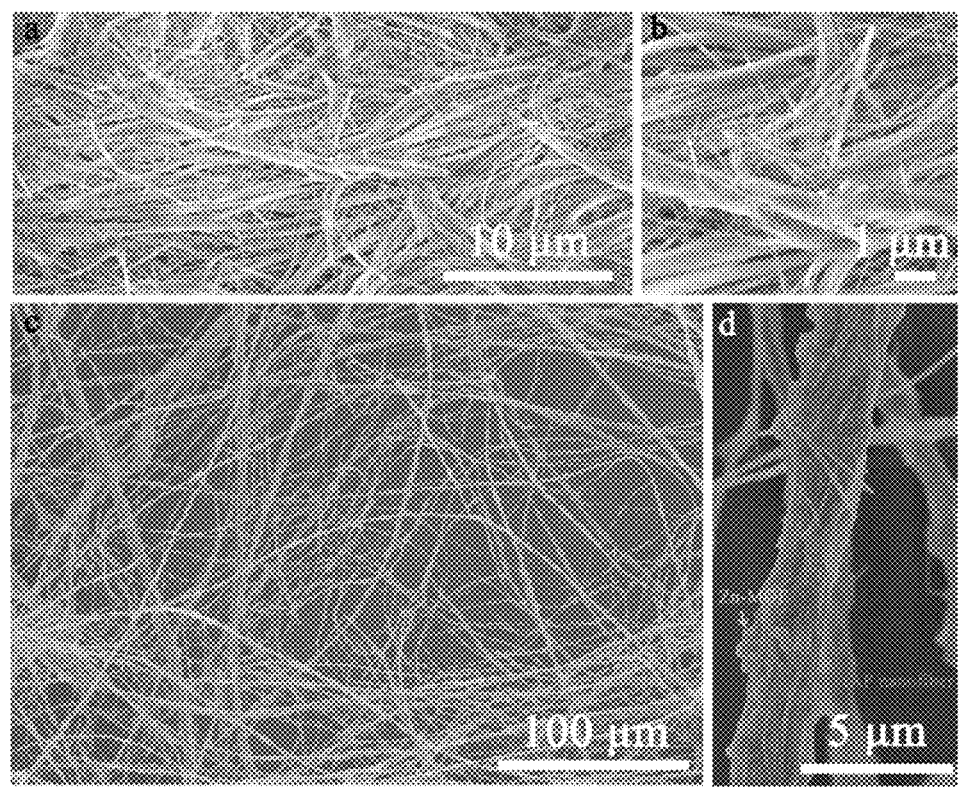
FIG. 33 shows SEM images of a hydroxyapatite nanowire (a and b) and a hydroxyapatite nanowire/Zn-MOF fiber (c and d) prepared in Embodiment 7.

FIG. 33 shows SEM images of a commercially available hydroxyapatite nanowire raw material (a and b) and the hydroxyapatite nanowire/Zn-MOF fiber (c and d) prepared in this embodiment. It can be seen from FIG. 33 that the hydroxyapatite nanoparticles are arranged along a radial direction of the composite fiber, and zinc-MOF nano particles are inlaid in the hydroxyapatite nanowire.

Embodiment 8

(1) A zinc oxide powder-assembled micro-nano composite fiber was prepared according to the same method as that in Embodiment 1, and the volume fraction of zinc oxide powder was controlled (0.01-10) to obtain representative functional fibers with different powder contents and thicknesses, and images of single composite fiber samples were taken.

Figure 34:
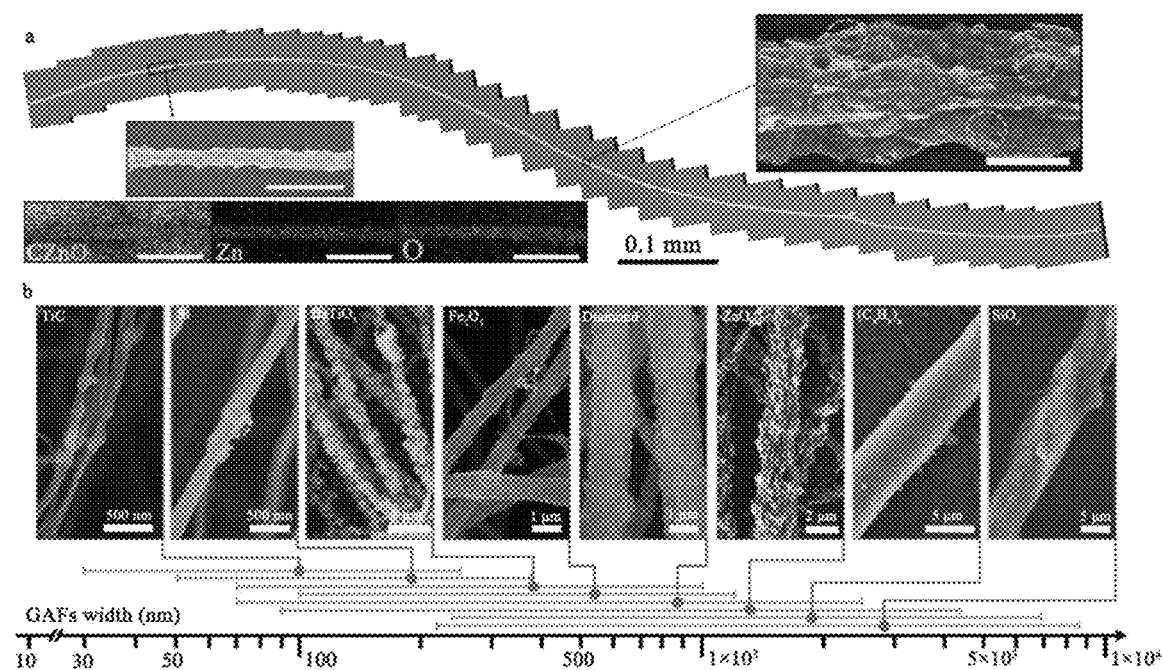
FIG. 34 shows an SEM image of a diameter distribution of a representative sample fiber prepared in Embodiment 8, and a composite SEM image formed by splicing high-resolution SEM images of ZnO-GAF along a fiber direction.

FIG. 34a shows samples with different powder contents prepared in this embodiment, with a thickness distribution range from 15 nanometers to 10 micrometers. FIG. 34b is an SEM image of a single zinc oxide composite fiber prepared in this embodiment, showing that a fiber length can reach a millimeter level.

Embodiment 9

(1) Silicon powder and tantalum powder were used as powder materials according to the same method as that in Embodiment 1; the volume fraction of the tantalum powder was controlled to be 3.46; and the volume fraction of silicon was controlled to be 0.0625.

FIG. 35a and FIG. 35b are SEM images of a tantalum composite nano fiber prepared in this embodiment. The mass content of the powder material is less than 1%; FIG. 35c and FIG. 35d are SEM images of a silicon composite fiber prepared in this embodiment. The mass content of the powder material is greater than 95%.

Figure 35:
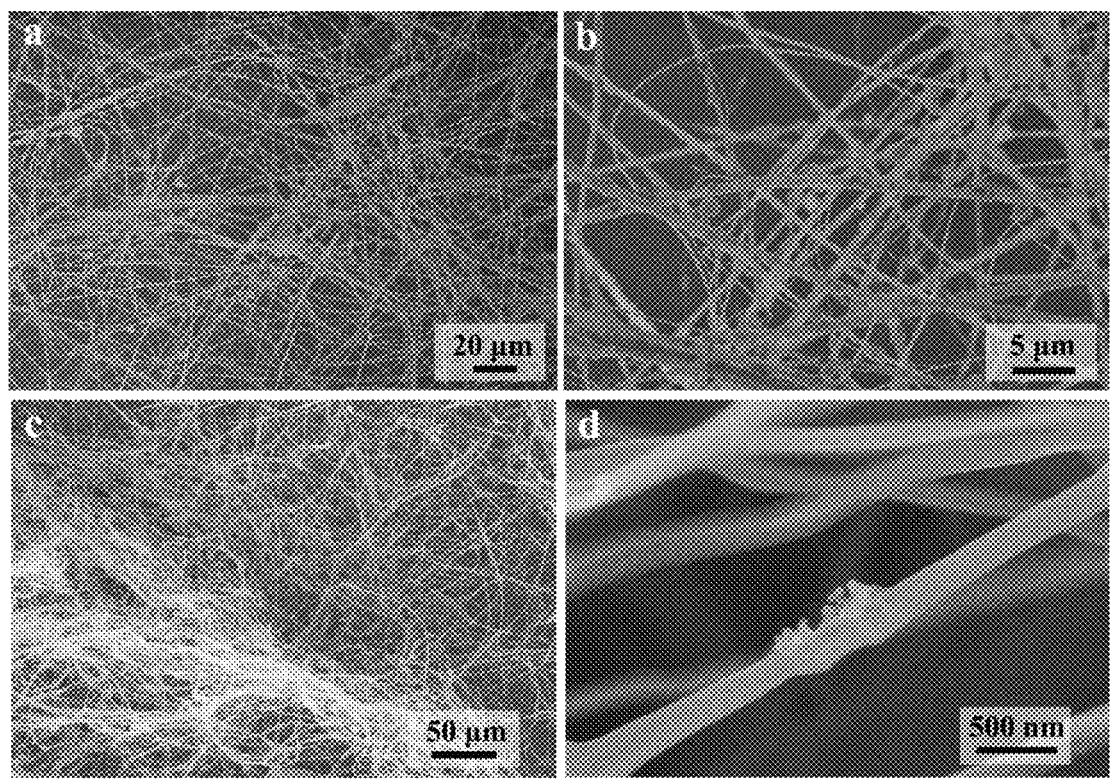
FIG. 35 is an SEM image of a composite micro-nano fiber prepared in Embodiment 9 of the present invention.

It can be seen from Embodiments 6 and 7 that the thickness of the composite micro-nano fiber prepared by the method of the present invention is related to the content of the powder material. As the powder content increases, the thickness of the fiber increases. The minimum thickness is dozens of nanometers, and the maximum thickness can be up to dozens of micrometers (FIG. 35). The content of the powder material in the composite micro-nano fiber of the present invention can be as small as less than 1% or as large as greater than 95%.

Embodiment 10

In this example, the thermal insulation performance of the silicon carbide ceramic powder-assembled composite micro-nano fiber prepared in Embodiment 6 of the present invention was tested. A specific test method was as follows:

The thermal conductivity of the silicon carbide composite micro-nano fiber and commercially available silicon carbide ceramics (from Shenzhen Kejing Star Technology Co., Ltd.) in air was measured with a thermal constant analyzer (TPS 2500S, Hot Disk): a heater was from 25° C. to 300° C., 600° C. and 1000° C., and cooling was from 25° C. to –40° C.

Figure 36:
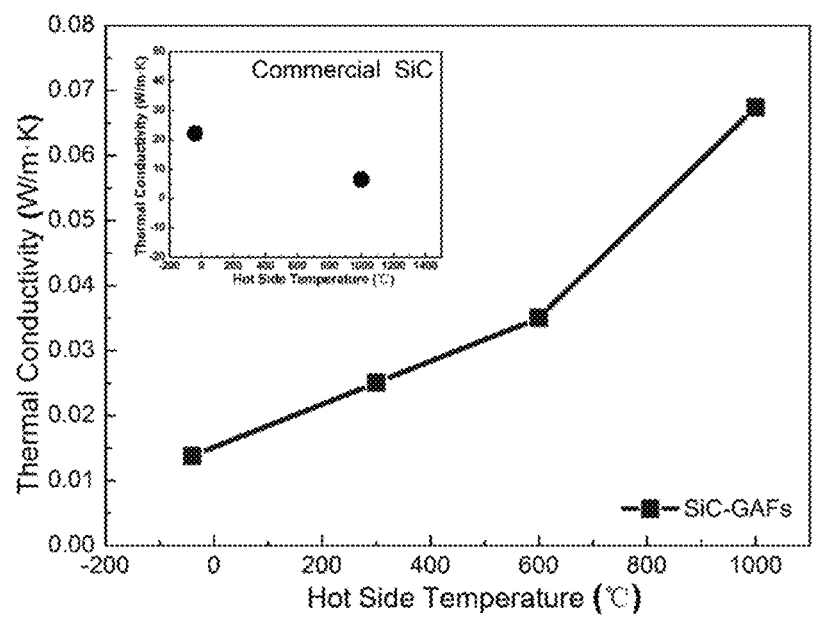
FIG. 36 is a steady-state thermal measurement result of a bulk structural body material prepared from a silicon carbide ceramic powder-assembled fiber in Embodiment 10 of the present invention.

The steady-state thermal measurement in FIG. 36 shows that thermal conductivity coefficients of the material prepared in this embodiment in air is 0.013 W/(m·K) at –40° C. and is 0.067 W/(m·K) at 1000° C., which are far less than 22.17 W/(m·K) and 6.55 W/(m·K) of pure SiC at –40° C. and 1000° C., indicating that the material of the present invention exhibits more excellent performance. This may be related to complete retention and good exposure of the original micro-nano structure of the powder in the fiber.

Embodiment 11

In this embodiment, a $SnO_2$/CNT mixed powder-assembled fiber film was prepared, and its gas-sensitive property was tested.

(1) Nano $SnO_2$ powder (50-70 nanometers, Aladdin reagent) with a volume fraction of 3 and 0.5 g/LCNT (99.9%, Aladdin reagent) were added into aqueous solution of two-dimensional cellulose (which was extracted from fir and had a thickness of 3-5 nanometers) with a concentration of 2 g/L; ultrasonic dispersion was performed for 15 minutes, and the temperature was controlled at 0° C.

(2) The mixed suspension prepared in step (1) was put into a container, and a temperature difference between upper and lower layers was controlled to be 50° C. under the assistance of ultra-low temperature liquid helium fluid fumigation, so as to control the crystallization rate of the mixed suspension. After being completely frozen, the suspension was put into a freeze dryer for freeze drying at –40° C. for 72 hours to obtain a $SnO_2$/CNT mixed powder-assembled composite micro-nano fiber.

(3) The $SnO_2$/CNT mixed powder-assembled composite micro-nano fiber obtained in step (2) was pressed into a fiber film ($SnO_2$/CNT-GAF film) with a thickness of 1 millimeter.

Comparative Example 2

A $SnO_2$/CNT/PVDF film prepared by the traditional molding method was compared with a $SnO_2$/CNT-GAF film prepared in Embodiment 11.

$SnO_2$ CNT and PVDF binders with a mass ratio of 8:1:2 were dispersed in an n-methyl-2-pyrrolidone solvent by ultrasound to obtain mixed slurry. The mixed slurry was dried at 80° C. for 2 hours to obtain slightly wet slurry. The slurry was rolled for multiple times to form the $SnO_2$/CNT/PVDF film.

Figure 37:
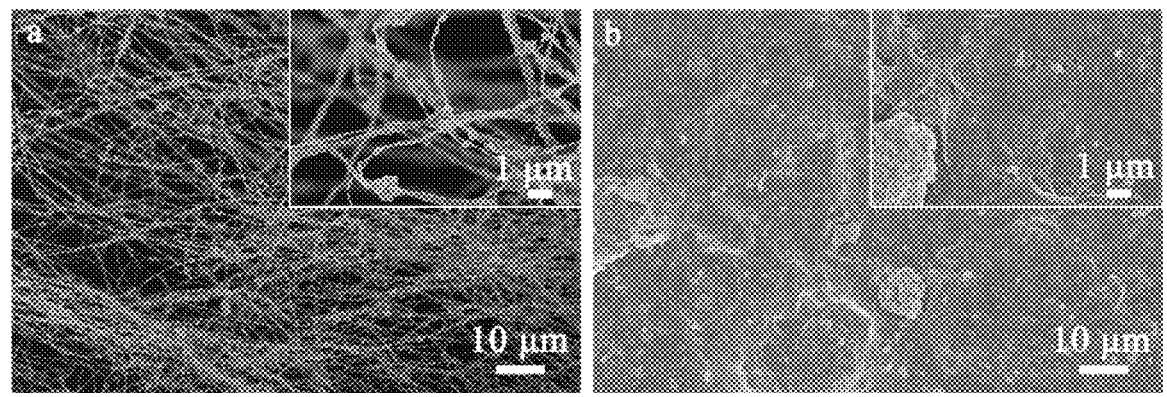
FIG. 37 is an SEM image of a $SnO_2$/CN-GAF film prepared in Embodiment 11 and a SnO2/CNT/PVDF film prepared in comparative example 2.

FIG. 37 is an SEM image of the $SnO_2$/CN-GAF film (a) prepared in Embodiment 11 and the $SnO_2$/CNT/PVDF film (b) prepared in comparative example 2. The SEM image of the $SnO_2$/CNT-GAFs shows that $SnO_2$ particles are inlaid in a uniform fiber, forming a bead-like structure (FIG. 37a). For a $SnO_2$/CNT/PVDF composite film, most of the $SnO_2$ nanoparticles were covered in the composite film, and a small number of exposed nanoparticles were severely agglomerated (FIG. 37b).

The gas-sensitive properties of the $SnO_2$/CNT-GAF film obtained in Embodiment 11 and the $SnO_2$/CNT/PVDF film obtained in comparative example 2 were tested according to the following method:

a gas sensor was measured: The $SnO_2$/CNT-GAF film was cut into a specific flake, and was then fixed on a test device with water serving as a solvent. Similarly, the $SnO_2$/CNT/PVDF slurry was also coated on the test device. The gas-sensitive properties of the two samples to methanol were tested with a Navigation 4000-NMDOG instrument at 120° C. after the two samples are completely dried.

Figure 38:
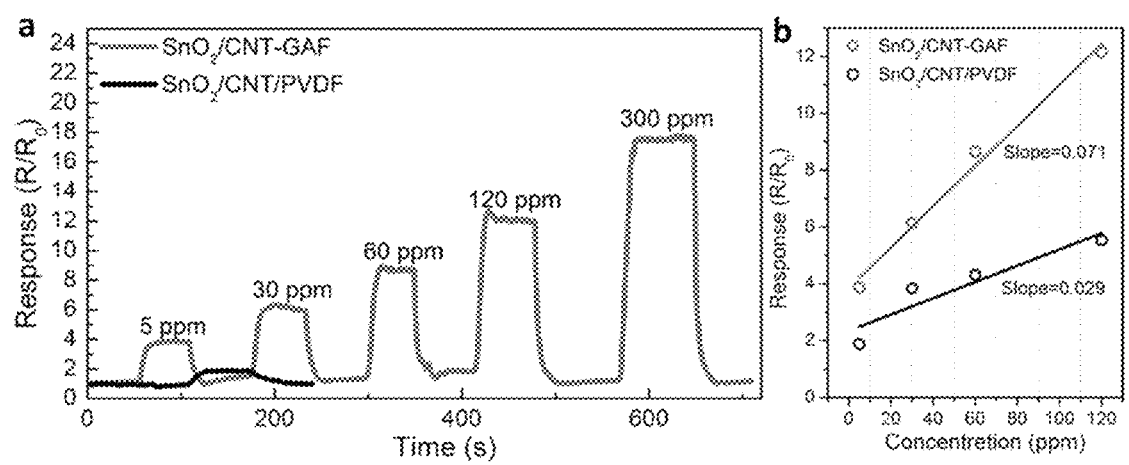
FIG. 38 shows a gas-sensitive property test result of the $SnO_2$/CN-GAF film prepared in Embodiment 11 and a $SnO_2$/CNT/PVDF film prepared in comparative example 2.

The gas-sensitive response properties of the $SnO_2$/CNT-GAF film sensor and the $SnO_2$/CNT/PVDF film sensor were calculated, and a time curve of the concentration of methanol was drawn (as shown in FIG. 38a). The response of the $SnO_2$/CNT-GAF film increased linearly with the increase of the concentration (5-300 ppm) of methanol, from 3.87 times to 17.78 times. However, the response of the $SnO_2$/CNT/PVDF film sensor prepared by the traditional molding method was poor, which was 1.87-7.44 times. At the concentration of 5 ppm, the response time and recovery time of the $SnO_2$/CNT-GAF film were 12 seconds and 18 seconds respectively, shorter than the response time and recovery time (22 seconds and 63 seconds) of the $SnO_2$/CNT/PVD film. In addition, the sensitivity of the $Sn_2$/CNT-GAF film was 0.071 ppm−1, which was better than that (0.029 ppm−1) of the $Sn_2$/CNT/PVDF film (as shown in FIG. 38b). These results show that the composite micro-nano fiber prepared in the present invention has great application potential in high-performance gas-sensitive devices.

What is claimed is:

1. A method for preparing a powder-assembled composite fiber, comprising the steps of:
   (1) preparing a planar cellulose from a cellulose-raw-material;
   (2) dispersing the planar cellulose and a powder material in a solvent to form a mixed suspension; and
   (3) performing freeze drying on the mixed suspension to obtain the powder-assembled composite fiber, wherein:
   a particle size of the powder material is 1 nanometer-10 micrometers;
   the planar cellulose has a flake structure with a thickness of 0.1-20 nm;
   a size of the planar cellulose in a planar direction is greater than 1 micrometer;
   a ratio of the maximum size in the planar direction to the thickness is greater than 200;
   a temperature difference between two ends in a vertical direction of the mixed suspension is controlled to be 10-100° C. in a freezing process of the freeze drying in step (3);
   preparing the planar cellulose from the cellulose-raw-material in step (1) comprises the steps of:
   (1-1) partially dissociating the cellulose-raw-material in a first solvent with high-frequency ultrasound to form a suspension of cellulose nanofibers with continuous branched structures; and
   (1-2) replacing the first solvent in the suspension with a second solvent, and then performing freeze drying on the obtained cellulose nanofiber suspension to obtain a crude planar cellulose;
   the first solvent is selected from one or more of water, ethanol, and ethylene glycol;
   the second solvent is selected from one or more of tert-butanol, benzene, and methylbenzene; and
   a temperature difference between two ends in a vertical direction of the suspension is controlled to be 10-100° C. in a freezing process of the freeze drying in step (1-2).

2. The method in claim 1, wherein step (1) further comprises: repeating steps (1-1) and step (1-2) twice to five times for improving the purity of the planar cellulose to 95% or above.

3. The method in claim 1, wherein: the degree of crystallization of the planar cellulose is less than that of ligno-based cellulose.

4. The method in claim 1, wherein: forming the mixed suspension in step (2) includes dispersing the planar cellulose and the powder material in the solvent simultaneously or sequentially.

5. The method in claim 1, wherein step (2) comprises:
   dispersing the planar cellulose in the solvent to form a planar cellulose suspension; and
   dispersing the powder material in the planar cellulose suspension to form the mixed suspension.

6. The method in claim 1, wherein: the concentration of the planar cellulose in the mixed suspension is 0.01-10 g/L.

7. The method in claim 6, wherein: the concentration of the planar cellulose in the mixed suspension is 1-5 g/L.

8. The method in claim 1, wherein:
   the volume fraction f of the powder material in the mixed suspension is 0.001-10;

$$f = \frac{V1}{M2},$$

where V1 is a bulk volume of the powder material;

$$V1 = \frac{M1}{d1};$$

M1 is a mass of the powder material;
d1 is a tap density of the powder material; and
M2 is a mass of the planar cellulose.

9. The method in claim 8, wherein: the volume fraction f of the powder material in the mixed suspension is 0.1-9.

10. The method in claim 1, wherein: step (2) comprises ultrasonically dispersing the mixed suspension containing the planar cellulose and the powder material for 1 second to 1 hour at −10 to 30° C.

11. The method in claim 1, wherein: the freezing process in step (3) is carried out with the assistance of an ultra-low temperature fluid fumigation device, so as to control the temperature difference.

12. The method in claim 11, wherein: the ultra-low temperature fluid is at least one of liquid helium, liquid nitrogen and liquid oxygen.

13. The method in claim 1, wherein:
   the drying process of the freeze drying in step (3) is carried out in a freeze dryer; and
   the duration of freeze drying is 2-80 hours.

14. The method in claim 1, wherein:
   the cellulose-raw-material in step (1) is plant cellulose fiber or a bacterial cellulose fiber; and
   the planar cellulose is self-assembled by plant cellulose fibers or bacterial cellulose fibers through hydrogen bonds.

15. The method in claim 14, wherein the plant cellulose is selected from the group consisting of moso bamboo, neosinocalamus affinis, spruce, fir, Korean pine, poplar, sorghum stalk, corn stalk, mulberry bark, bark of Wikstroemiapilosa Cheng, rice straw, wheat straw, reed, cotton, cotton linter, kenaf, jute, flax, banana leaf, agave hemp, Chinese alpine rush, *Cyperus malaccensis* and bagasse.

16. The method in claim 14, wherein:
   microorganisms for preparing the bacterial cellulose are selected from the group consisting of *Acetobacter, Rhizobium, Gluconobacter, Acetobacter xyloides, Sarcina, Pseudomonas, Achromobacter, Alcaligenes, Aerobacter, Azotobacter* and *Agrobacterium*; and
   a carbon source of a fermentation culture medium for preparing the bacterial cellulose is selected from the group consisting of glucose, sucrose, lactose, maltose, mannitol and arabinose.

17. The method in claim 1, wherein a thickness of the planar cellulose is 0.5-5 nanometers.

18. The method in claim 1, wherein a content of amorphous cellulose in the planar cellulose is 30-50 wt %.

19. The method in claim 1, wherein:
   a diameter of the composite fiber prepared with the method is 0.01-20 micrometers; and
   a length of the composite fiber prepared with the method is 100 micrometers-50 millimeters.

20. The method in claim 1, wherein: the solvent is at least one of water, ethanol, ethylene glycol, tert-butanol, benzene and methylbenzene.

* * * * *